United States Patent
Maruyama et al.

(10) Patent No.: US 11,164,511 B2
(45) Date of Patent: Nov. 2, 2021

(54) MITIGATING ARTIFACTS ASSOCIATED WITH LONG HORIZONTAL BLANK PERIODS IN DISPLAY PANELS

(71) Applicant: Synaptics Incorporated, San Jose, CA (US)

(72) Inventors: Atsushi Maruyama, Tokyo (JP); Kazuhiro Okamura, Tokyo (JP); Daisuke Ito, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/836,476

(22) Filed: Mar. 31, 2020

(65) Prior Publication Data
US 2021/0304660 A1 Sep. 30, 2021

(51) Int. Cl.
*G09G 3/32* (2016.01)

(52) U.S. Cl.
CPC .......... *G09G 3/32* (2013.01); *G09G 2310/061* (2013.01); *G09G 2310/067* (2013.01); *G09G 2320/0266* (2013.01)

(58) Field of Classification Search
CPC ....... G09G 2310/067; G09G 2310/061; G09G 2320/02; G09G 2320/0233; G09G 2320/0257; G09G 2320/0266; G06F 3/04166
See application file for complete search history.

(56) References Cited

U.S. PATENT DOCUMENTS

| | | | |
|---|---|---|---|
| 2015/0116303 A1* | 4/2015 | Lee ...................... | G09G 3/3233 345/212 |
| 2018/0300000 A1* | 10/2018 | Takada ................. | G09G 3/3611 |
| 2019/0073074 A1* | 3/2019 | Kim ...................... | G06F 3/0412 |

* cited by examiner

*Primary Examiner* — Laurence J Lee
(74) *Attorney, Agent, or Firm* — Ferguson Braswell Fraser Kubasta PC

(57) ABSTRACT

A display panel includes a first scan driving circuit, a second scan driving circuit, and a third scan driving circuit. The first scan driving circuit is configured to generate a first gate scan signal to control programming of a first display line in a first horizontal sync period that includes a long horizontal blank (LHB) period. The second scan driving circuit is configured to generate a first dummy gate scan signal to control initialization of a second display line in the LHB period of the first horizontal sync period. The third scan driving circuit is configured to generate a second gate scan signal to control programming of the second display line in a second horizontal sync period that follows the first horizontal sync period.

17 Claims, 31 Drawing Sheets

D:Display Update Period
B:Normal Horizontal Blank Period
Long-H Blank:Long Horizontal Blank Period

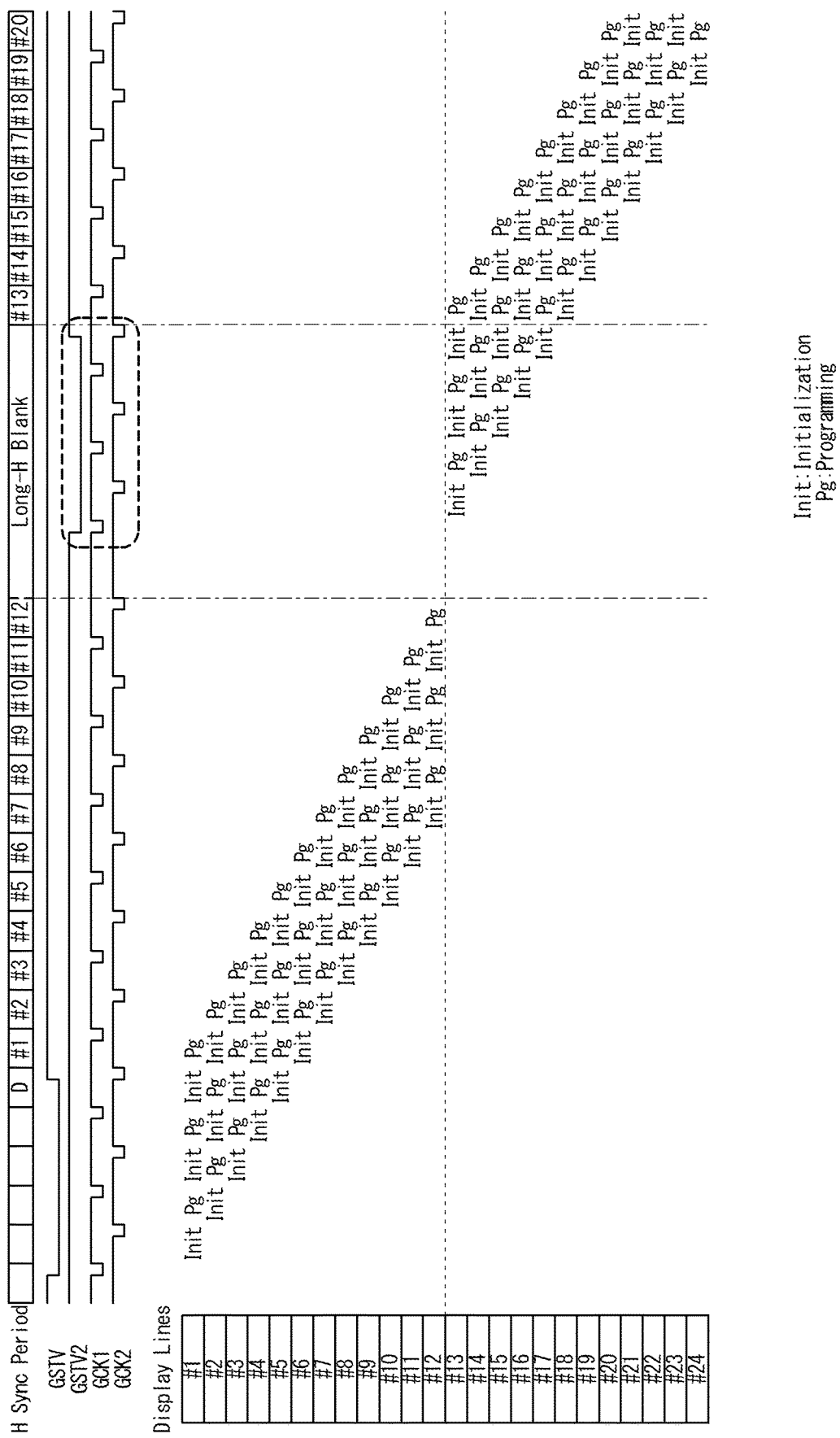

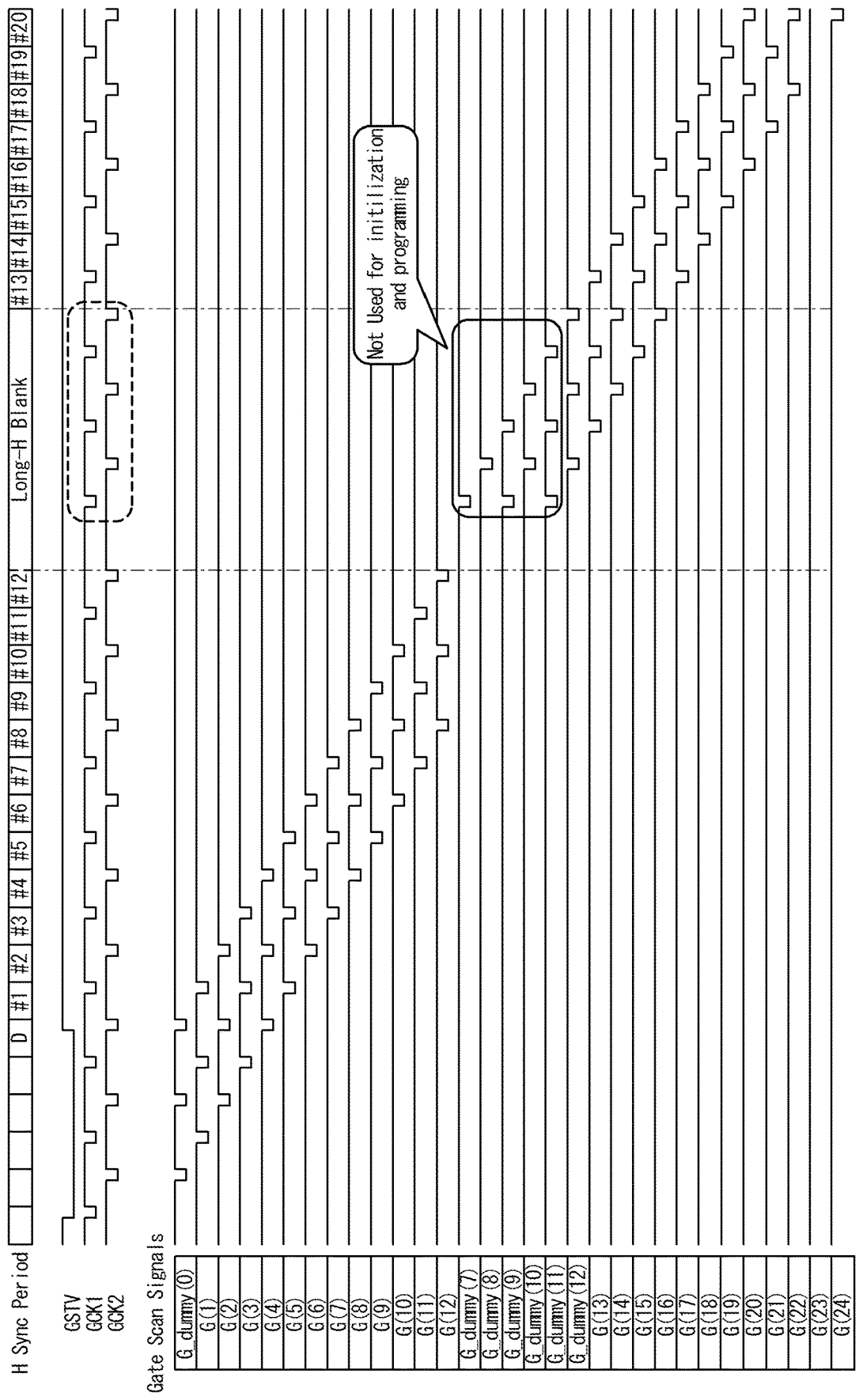

MITIGATING ARTIFACTS ASSOCIATED WITH LONG HORIZONTAL BLANK PERIODS IN DISPLAY PANELS

FIELD

Embodiments disclosed herein generally relate to a display panel and method for controlling the same.

BACKGROUND

User interface devices including a display panel and a proximity sensor device may be used in a variety of electronic systems. In such user interface devices, signals for display updating may cause interference on signals for proximity sensing. Accordingly, a technical need exists for suppressing or avoiding interference between display updating and proximity sensing.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a display panel is provided. The display panel comprises a first scan driving circuit, a second scan driving circuit, and a third scan driving circuit. The first scan driving circuit is configured to generate a first gate scan signal to control programming of a first display line in a first horizontal sync period that includes a long horizontal blank (LHB) period. The second scan driving circuit is configured to generate a first dummy gate scan signal to control initialization of a second display line in the LHB period of the first horizontal sync period. The third scan driving circuit is configured to generate a second gate scan signal to control programming of the second display line in a second horizontal sync period that follows the first horizontal sync period.

In one or more embodiments, a user interface device is provided. The user interface device comprises a display panel and a sensor module. The display panel comprises a first scan driving circuit, a second scan driving circuit, and a third scan driving circuit. The first scan driving circuit is configured to generate a first gate scan signal to control programming of a first display line in a first horizontal sync period that includes an LHB period. The second scan driving circuit is configured to generate a first dummy gate scan signal to control initialization of a second display line in the LHB period of the first horizontal sync period. The third scan driving circuit is configured to generate a second gate scan signal to control programming of the second display line in a second horizontal sync period that follows the first horizontal sync period.

In one or more embodiments, a method is provided. The method comprises generating a first gate scan signal to control programming of a first display line in a first horizontal sync period that includes an LHB period and generating a dummy gate scan signal to control initialization of a second display line in the LHB period of the first horizontal sync period. The method further comprises generating a second gate scan signal to control programming of the second display line in a second horizontal sync period that follows the first horizontal sync period.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 19A and FIG. 19B illustrate an example operation of a display panel, according to one or more embodiments.

FIG. 23A and FIG. 23B illustrate an example operation of a display panel, according to one or more embodiments.

Figure 1:
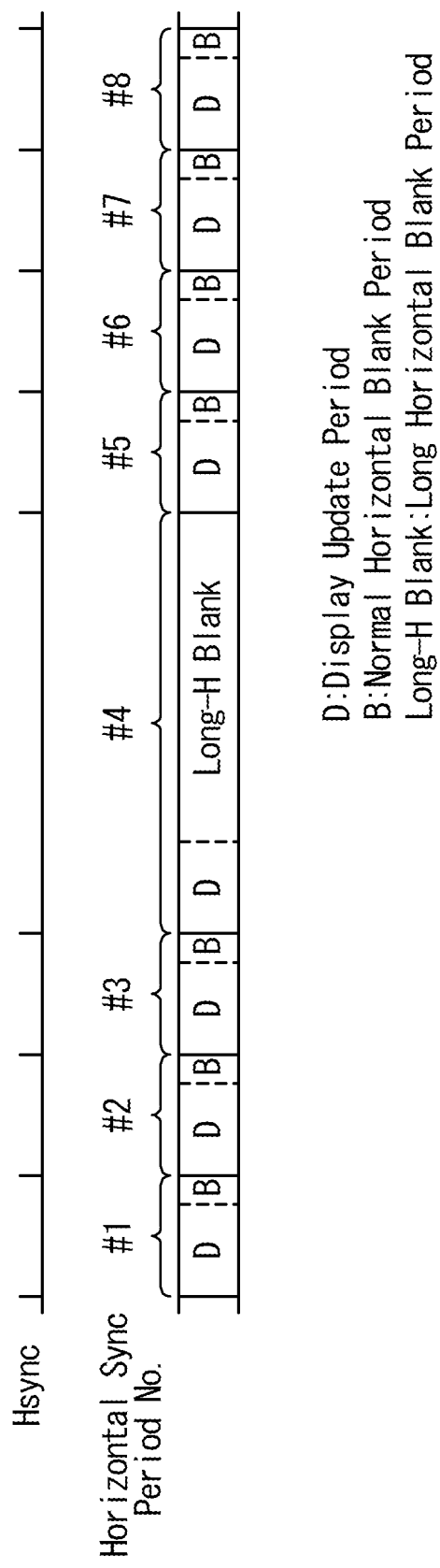
FIG. 1 illustrates an example display drive operation including a long horizontal blank (LHB) period, according to one or more embodiments.

To facilitate understanding, identical reference numerals have been used, where possible, to designate identical elements that are common to the figures. If appropriate, suffixes may be attached to reference numerals to distinguish the identical elements from each other. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

A user interface device in an electronic system may include a display panel and a proximity sensor device. Some non-limiting examples of display panels include organic light emitting diode (OLED) display panels and micro light emitting diode (LED) display panels. Some non-limiting examples of electronic systems include cellular phones such as smart phones, personal computers of all sizes and shapes, such as desktop computers, laptop computers, netbook computers, tablets, web browsers, e-book readers, and personal digital assistants (PDAs). The display panel may be configured to display an image on a display screen, and the proximity sensor device may be configured to determine the presence, location, force and/or motion of one or more input objects in a sensing region defined on the display screen.

In such a user interface device, display updating may cause interference on proximity sensing. Signals for programming pixel circuits of the display panel (e.g., gate scan signals and source signals) may cause an undesired effect on signals for proximity sensing (e.g., transmitter signals supplied to sensor electrodes and resulting signals received from the sensor electrodes), and this may affect the accuracy of proximity sensing.

Including a horizontal sync period having a "long horizontal blank (LHB) period" that is sufficiently long to process signals for proximity sensing suppresses or avoids interference. Signal processing for proximity sensing may include supplying transmitter signals to sensor electrodes and receiving resulting signals from the sensor electrodes. FIG. 1 illustrates an example display drive operation in which a horizontal sync signal Hsync is asserted at the beginning of each horizontal sync period, and each horizontal sync period includes a display update period D and a horizontal blank period B or LHB. Some, but not all, horizontal sync periods include an LHB period, and the remaining horizontal sync periods include a normal horizontal blank period, where the LHB period is longer than the normal horizontal blank period. In the illustrated embodiment, horizontal sync periods #1 to #3 and #5 to #8 include a normal horizontal blank period, and horizontal sync period #4 includes an LHB period.

Figure 2:
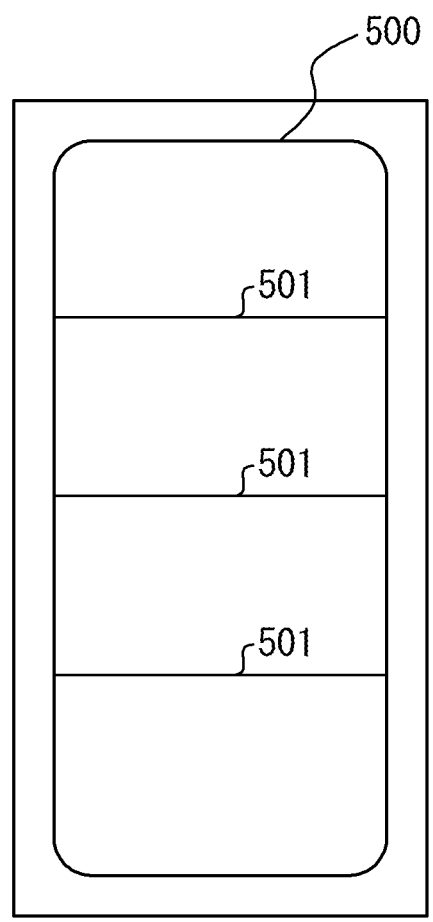
FIG. 2 illustrates an example display image including undesired brightness unevenness or artifact.

Inclusion of an LHB period in a horizontal sync period may, however, cause undesirable brightness unevenness or artifact in the display image that may be visually perceived as lines 501 extending in the horizontal direction of a display panel 500 as illustrated in FIG. 2. In display panels where updating a pixel circuit is performed over two or more horizontal sync periods, brightness unevenness or artifact may be caused by charge leakage from pixel circuits during an LHB period. For example, updating a pixel circuit may include initializing the pixel circuit in a first horizontal sync period and programming the pixel circuit with a source signal in a second, subsequent, horizontal sync period. When the first horizontal sync period includes an LHB period, a portion of the electric charges accumulated by the pixel circuit initialization may be lost during the LHB period, causing a change in the luminance level of the pixel circuit. Because a row of pixel circuits is initialized in the first horizontal sync period, the loss of the electric charges may also occur in the row of pixel circuits during the LHB period. The effect caused by the charge leakage may be visually perceivable in the form of a horizontal line in the display image. In embodiments where a gate scan driver includes bootstrap circuitry to generate gate scan signals, charge leakage from the bootstrap circuitry may also cause brightness unevenness or artifact in the display image. For example, the bootstrap circuitry may be configured to generate a gate scan signal by using electric charges accumulated by using another gate scan signal previously generated. In such embodiments, charge leakage from the bootstrap circuitry may cause an insufficient amplitude of a gate scan signal, resulting in brightness unevenness or artifact.

The disclosure describes display panels and methods that address brightness unevenness or artifact potentially caused by LHB periods by inserting dummy gate scan signals to control initialization of the associated display lines. The assertion of the dummy gate scan signals effectively reduces the time duration between initialization and programming of the pixel circuits of the subsequent display line, suppressing charge leakage from the pixel circuits of the that display line. This effectively suppresses generation of undesired brightness unevenness or artifact at the subsequent display line.

Figure 3:
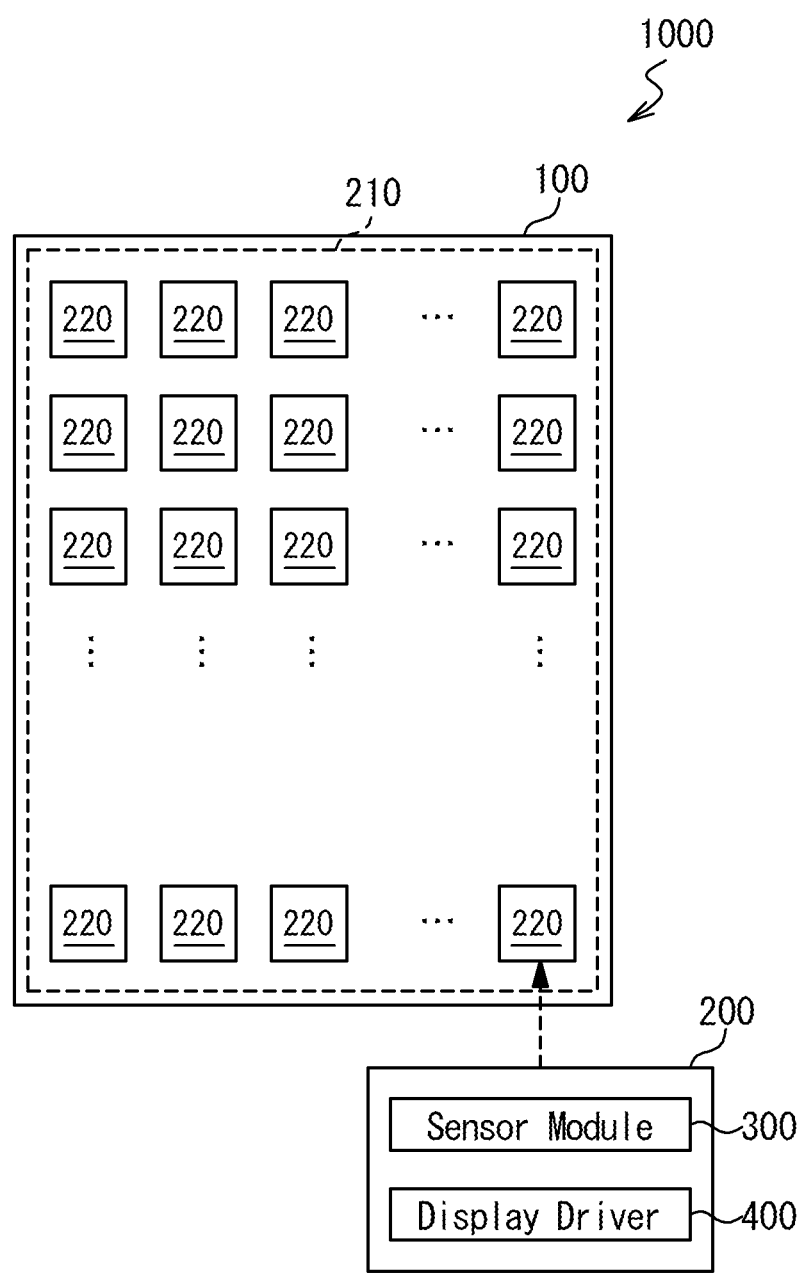
FIG. 3 illustrates an example configuration of a user interface device, according to one or more embodiments.

FIG. 3 illustrates an example configuration of a user interface device 1000, according to one or more embodiments. In the illustrated embodiment, the user interface device 1000 includes a display panel 100 and a processing system 200. The display panel 100 may include an OLED display panel or a micro LED display panel. The processing system 200 is configured to control the display panel 100 and detect one or more input objects (e.g., user's fingers and styli) in a sensing region 210. The sensing region 210 may overlap at least a portion of an active area of the display panel 100. The active area may correspond to a portion of the display panel 100 where images are updated. An array of sensor electrodes 220 for proximity sensing are configured to sense input in the sensing region 210. The sensor electrodes 220 may be integrated in a touch panel (not illustrated) disposed opposed to the display panel 100. In other embodiments, the sensor electrodes 220 may be integrated in the display panel 100.

The processing system 200 includes a sensor module 300 and a display driver 400. The sensor module 300 is electrically coupled to the sensor electrodes 220. For input sensing, the sensor module 300 is configured to drive transmitter signals onto the sensor electrodes 220 and receive resulting signals from the sensor electrodes 220 during an LHB period. The sensor module 300 may be further configured to perform proximity sensing based on the resulting signals. The proximity sensing may be achieved through self-capacitance sensing (also referred to as absolute capacitance sensing) or mutual capacitance sensing (also referred to as transcapacitance sensing.) The proximity sensing may include determining the presence, location, force and/or motion of one or more input objects in the sensing region 210. The display driver 400 is configured to update images displayed in the active area of the display panel 100. The sensor module 300 and the display driver 400 may be integrated in different integrated circuit (IC) chips. In other embodiments, the sensor module 300 and the display driver 400 may be monolithically integrated in a single IC chip.

Figure 4:
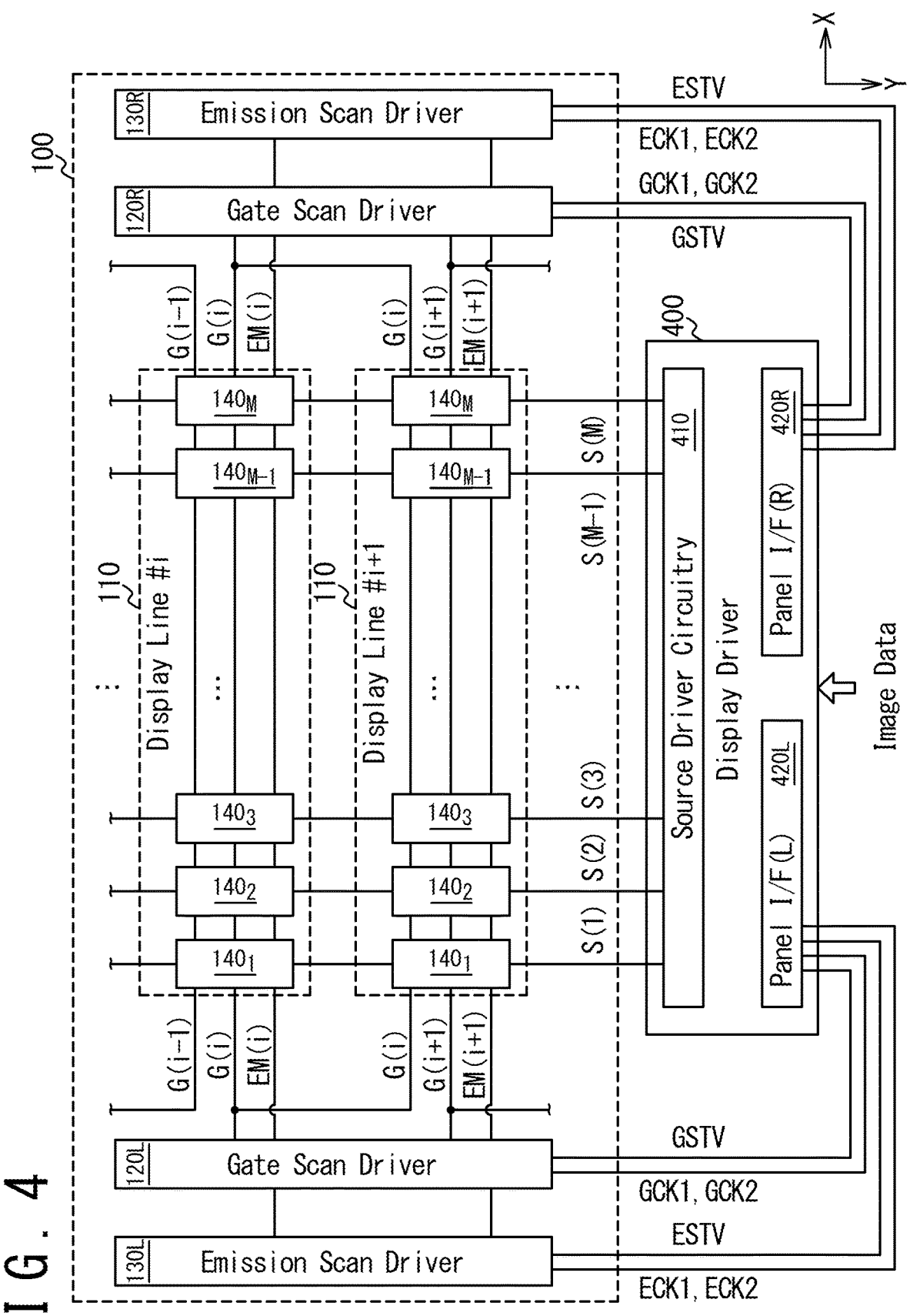
FIG. 4 illustrates example configurations of a display panel and a display driver, according to one or more embodiments.

FIG. 4 illustrates example configuration of the display panel 100 and the display driver 400, according to one or more embodiments. In the illustrated embodiment, the display panel 100 includes an array of display lines 110 (two illustrated, Display Line #i and Display Line #i+1), a left-side gate scan driver 120L, a right-side gate scan driver 120R, a left-side emission scan driver 130L, and a right-side emission scan driver 130R. The left-side gate scan driver 120L is located in a first direction (−X direction in FIG. 4) with respect to the array of display lines 110 and the right-side gate scan driver 120R is located in a second direction (+X direction in FIG. 4) opposite to the first direction with respect to the array of display lines 110.

The gate scan drivers 120L and 120R are configured to generate gate scan signals G in response to gate scan start pulse signals GSTV and gate scan shift clocks GCK1 and GCK2 received from the display driver 400, which is external to the display panel 100. The gate scan drivers 120L and 120R are configured as shift registers that operate in synchronization with the gate scan shift clocks GCK1 and GCK2. The gate scan drivers 120L and 120R are configured to start the shift register operation in response to assertions of the gate scan start pulse signals GSTV. The emission scan drivers 130L and 130R are configured to generate emission scan signals EM in response to emission scan start pulse signals ESTV and emission scan shift clocks ECK1 and ECK2. The emission scan drivers 130L and 130R are configured as shift registers that operate in synchronization with the emission scan shift clocks ECK1 and ECK2. The emission scan drivers 130L and 130R are configured to start the shift register operation in response to assertions of the emission scan start pulse signals ESTV. The left-side gate scan driver 120L and the left-side emission scan driver 130L are disposed on the left of the array of display lines 110. The right-side gate scan driver 120R and the right-side emission scan driver 130R are disposed on the right of the array of display lines 110.

The display lines 110 each include a row of pixel circuits 140 arrayed in a first direction of the display panel 100, which is illustrated as the horizontal or X-axis direction in FIG. 4. In the illustrated embodiment, each display line 110 includes M pixel circuits $140_1$ to $140_M$. The display lines 110 are arrayed in a second direction of the display panel 100, which is illustrated as the vertical or Y-axis direction in FIG. 4. The i-th display line 110 from the top may be hereinafter referred to as display line #i.

In various embodiments, the pixel circuits 140 of display line #i are configured to receive gate scan signals G(i−1) and G(i) from the gate scan drivers 120L, 120R, an emission scan signal EM(i) from the emission scan drivers 130L and 130R. The left-side gate scan driver 120L is configured to supply the gate scan signals G(i−1) and G(i) from the left, and the right-side gate scan driver 120R is configured to supply the gate scan signals G(i−1) and G(i) from the right. Further, the left-side emission scan driver 130L is configured to supply the emission scan signal EM(i) from the left, and the right-side emission scan driver 130R is configured to supply the emission scan signal EM(i) from the right. The gate scan signal G(i) is used to control programming of the pixel circuits 140 of display line #i. The pixel circuits $140_1$ to $140_M$ of display line #i are programmed with the source signals S(1) to S(M), respectively, when the gate scan signal G(i) is asserted. The gate scan signal G(i−1) is used to control initialization of the pixel circuits 140 of display line #i before the programming. The pixel circuits 140 of display line #i are initialized when the gate scan signal G(i−1) is asserted. In one or more embodiments, the gate scan signals G and the emission scan signals EM are low-active signals.

Figure 5:
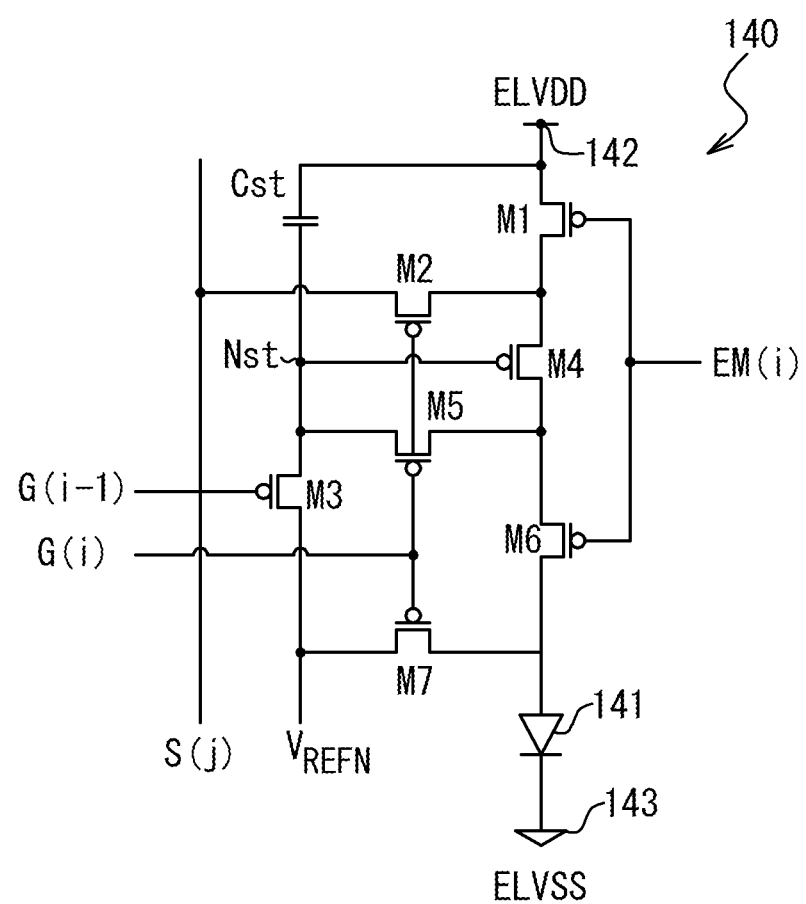
FIG. 5 illustrates an example configuration of a pixel circuit, according to one or more embodiments.

FIG. 5 illustrates an example configuration of a pixel circuit 140 of display line #i, according to one or more embodiments. In the illustrated embodiment, the pixel circuit 140 includes emission control transistors M1, M6, select transistors M2, M3, M5, M7, a drive transistor M4, a storage capacitor Cst, and a light emitting element 141. The transistors M1 to M7 may be configured as positive-channel metal oxide semiconductor (PMOS) transistors. The light emitting element 141 may be an LED, OLED, or other light emitting elements suitable for the type of display panel 100. The emission control transistor M1, the drive transistor M4, the emission control transistor M6, and the light emitting element 141 are connected in series between a high-side power source 142 configured to supply a high-side power source voltage ELVDD and a low-side power source 143 configured to supply a low-side power source voltage ELVSS. The emission control transistors M1 and M6 have commonly-connected gates that receive the emission scan signal EM(i). The drive transistor M4 has a gate connected to a storage node Nst. The select transistor M2 has a gate that receives the gate scan signal G(i), a source that receives the source signal S(j), and a drain connected to the source of the drive transistor M4. The select transistor M3 has a gate that receives the gate scan signal G(i−1), a source connected to the storage node Nst, and a drain that receives an initializing voltage $V_{REFN}$. The initializing voltage $V_{REFN}$ may have a fixed voltage level. The select transistor M5 is connected between the drain of the drive transistor M4 and the storage node Nst. The select transistor M5 has a gate that receives the gate scan signal G(i). The select transistor M7 has a gate that receives the gate scan signal G(i), a source that receives the initializing voltage $V_{REFN}$, and a drain connected to the drain of the emission control transistor M6. The storage capacitor Cst is connected between the storage node Nst and the high-side power source 142. The pixel circuit 140 is configured emits light with a luminance level corresponding to the voltage across the storage capacitor Cst.

Light emission from the pixel circuit 140 is controlled by the emission scan signal EM(i). When the emission scan signal EM(i) is asserted, the emission control transistors M1 and M6 are turned on, and this generates a drive current through the light emitting element 141. The level of the drive current depends on the gate-source voltage of the drive transistor M4, that is, the voltage across the storage capacitor Cst.

In one embodiment, updating of the pixel circuit 140 includes two phases: initialization and programming. The initialization involves applying the initializing voltage $V_{REFN}$ to the storage capacitor Cst. This is achieved by asserting the gate scan signal G(i−1). When the gate scan signal G(i−1) is asserted, the select transistor M3 is turned on and the initializing voltage $V_{REFN}$ is supplied to the storage capacitor Cst via the select transistor M3. The programming involves applying the source signal S(j) to the storage capacitor Cst. This is achieved by deasserting the emission scan signal EM(i) and asserting the gate scan signal G(i). When the gate scan signal G(i) is asserted, the select transistors M2 and M5 are turned to supply the source signal S(j) to the storage capacitor Cst via the select transistor M2, the drive transistor M4, and the select transistor M5. During the programming, the source signal S(j) goes through the drive transistor M4 and this allows compensation of manufacturing variations of the drive transistor M4. The manufacturing variations may include a variation in the threshold voltage and/or a variation in the channel mobility.

The pixel circuit 140 may be configured differently than that illustrated in FIG. 5. For example, the pixel circuit 140 may be configured as a 5T2C circuit (including five thin film transistors (TFTs)) and two capacitors or a 6T1C circuit (including six TFTs and one capacitor). Also in such embodiments, updating the pixel circuit 140 may be achieved in a similar manner.

Referring back to FIG. 4, the display driver 400 includes source driver circuitry 410, a left-side panel interface (I/F) 420L, and a right-side panel interface 420R. The source driver circuitry 410 is configured to generate the source signals S(1) to S(M) based on externally-received image data. In one or more embodiments, the image data may include grayscale values associated with the pixel circuits 140, respectively, and the source signals S used to program the respective pixel circuits 140 have voltage levels corresponding to the associated grayscale values. The left-side panel interface 420L is configured to generate and supply the gate scan start pulse signal GSTV and the pair of gate scan shift clocks GCK1 and GCK2 to the left-side gate scan driver 120L. The left-side panel interface 420L is further configured to generate and supply the emission scan start pulse signal ESTV and the emission scan shift clocks ECK1 and ECK2 to the left-side emission scan driver 130L. The right-side panel interface 420R is configured to generate and supply the gate scan start pulse signal GSTV and the pair of gate scan shift clocks GCK1 and GCK2 to the right-side gate scan driver 120R. The right-side panel interface 420R is further configured to generate and supply the emission scan start pulse signal ESTV and the emission scan shift clocks ECK1 and ECK2 to the right-side emission scan driver 130R. In various embodiments, the left-side panel interface 420L and the right-side panel interface 420R are configured to generate the gate scan start pulse signals GSTV with substantially the same waveform, generate the gate scan shift clocks GCK1 with substantially the same waveform, and generate the gate scan shift clocks GCK2 with substantially the same waveform. Further, the left-side panel interface 420L and the right-side panel interface 420R may be configured to generate the emission scan start pulse signals ESTV with substantially the same waveform, generate the emission scan shift clocks ECK1 with substantially the same waveform, and generate the emission scan shift clocks ECK2 with substantially the same waveform.

Figure 6:
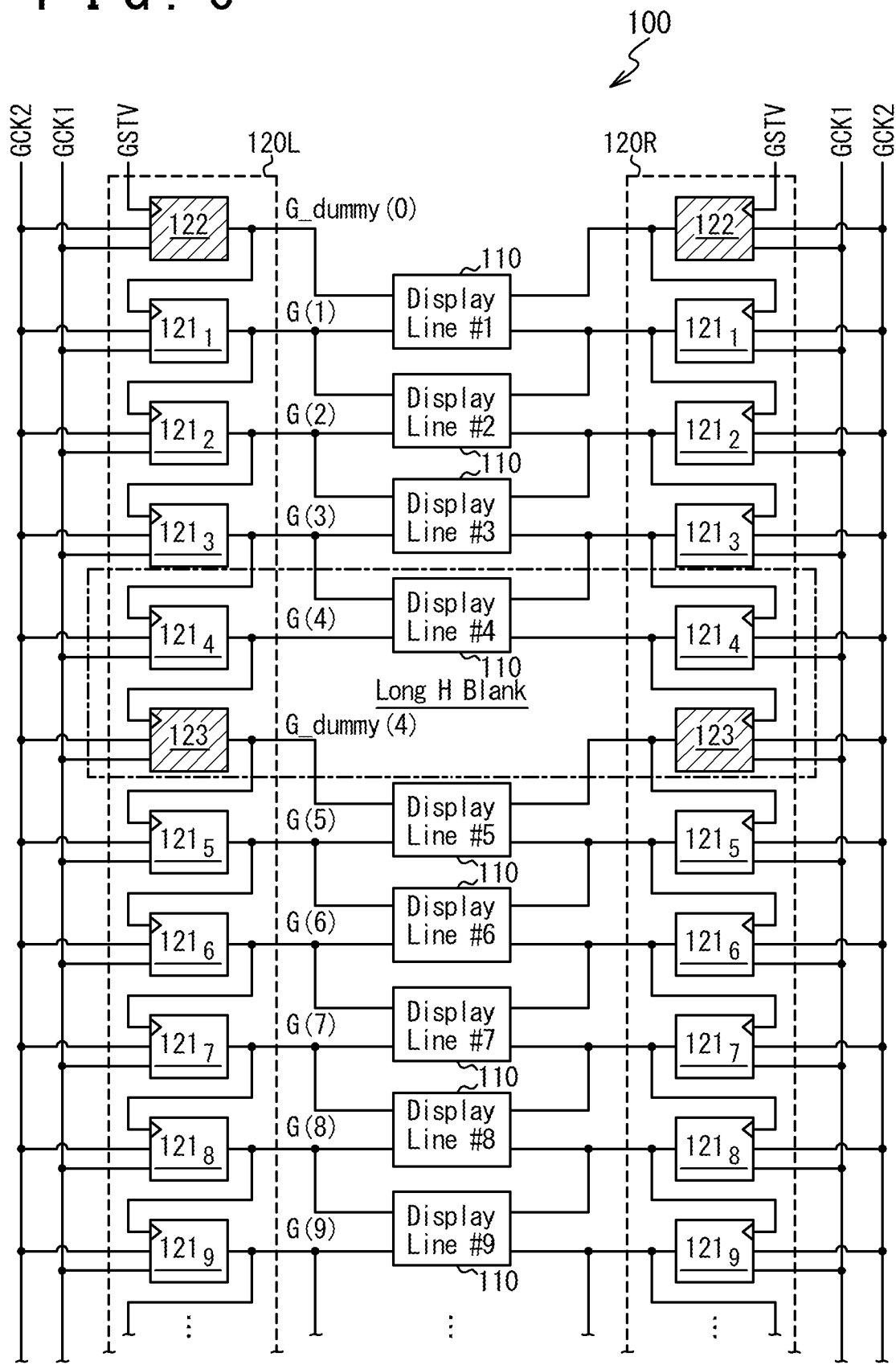
FIG. 6 illustrates example configurations of a left-side gate scan driver and a right-side gate scan driver, according to one or more embodiments.

FIG. 6 illustrates example configurations of the left-side gate scan driver 120L and the right-side gate scan driver 120R of the display panel 100, according to one or more embodiments. In the illustrated embodiment, the left-side gate scan driver 120L and the right-side gate scan driver 120R have the same circuit configuration. The left-side gate scan driver 120L and the right-side gate scan driver 120R each include a set of scan driving circuits 121, a dummy scan driving circuit 122, and one or more dummy scan driving circuits 123 (one illustrated for each of the left-side gate scan driver 120L and the right-side gate scan driver 120R). Each scan driving circuit 121 is configured to generate the gate scan signal G(i), which is used to control the programming of the pixel circuits 140 of display line #i. The dummy scan driving circuits 122 and 123 are configured to generate dummy gate scan signals G_dummy which are only used for controlling initialization of the associated display lines 110. The initialization of pixel circuits 140 of some of the display lines 110 is controlled by the dummy gate scan signals G_dummy, while the initialization of the pixel circuits 140 of display line #i of the remaining display lines is controlled by the gate scan signal G(i−1). In the illustrated embodiment, the initialization of the pixel circuits 140 of display line #1, which is located at the top of the array of the display lines 110, is controlled by the dummy gate scan signal G_dummy(0), and the initialization of the pixel circuits 140 of display line #5, which is located in an intermediate position of the array of the display lines 110, is controlled by the dummy gate scan signal G_dummy(4).

The scan driving circuits 121 and the dummy scan driving circuits 122 and 123 are serially connected to form a shift register configured to generate the gate scan signals G and the dummy gate scan signals G_dummy through a shift operation in synchronization with the gate scan shift clocks GCK1 and GCK2. The shift register operation is initiated in response to an assertion of the gate scan start pulse signal GSTV. In the illustrated embodiment, the dummy scan driving circuit 122 is configured to receive the gate scan start pulse signal GSTV and generate the dummy gate scan signal G_dummy(0) using the gate scan start pulse signal GSTV. The scan driving circuits $121_1$ is configured to generate the gate scan signal G(1) using the dummy gate scan signal G_dummy(0), and the scan driving circuits $121_2$, $121_3$, and $121_4$ are configured to generate the gate scan signals G(2), G(3), and G(4) using the gate scan signals G(1), G(2), and G(3), respectively. The dummy scan driving circuit 123 is configured to generate the dummy gate scan signal G_dummy(4) using the gate scan signal G(4), and the scan driving circuits $121_5$ is configured to generate the gate scan signal G(5) using the dummy gate scan signal G_dummy(4). The scan driving circuits $121_6$, $121_7$, $121_8$, and $121_9$ are configured to generate the gate scan signals G(6), G(7), G(8), and G(9) using the gate scan signals G(5), G(6), G(7), and G(8), respectively.

In the illustrated embodiment, the scan driving circuit $121_4$ is configured to assert the gate scan signal G(4) in a horizontal sync period that includes an LHB period, and the scan driving circuit $121_5$ is configured to assert the gate scan signal G(5) in the next horizontal sync period. If the pixel circuits 140 of display line #5 are initialized in response to the assertion of the gate scan signal G(4), this may cause charge leakage from the pixel circuits 140 of display line #5 during the LHB period.

To reduce or avoid the charge leakage, the dummy scan driving circuit 123 is configured to assert the dummy gate scan signal G_dummy(4) at or near the end of the LHB period to cause the initialization of display line #5. This assertion of the dummy gate scan signal G_dummy(4) effectively reduces the time duration between initialization and programming of the pixel circuits 140 of display line #5, suppressing charge leakage from the pixel circuits 140 of display line #5. This effectively suppresses generation of undesired brightness unevenness or artifact at display line #5.

While only one dummy scan driving circuit 123 is illustrated for each of the left-side gate scan driver 120L and the right-side gate scan driver 120R in FIG. 6, the number and locations of dummy scan driving circuits 123 may be modified based on locations of horizontal sync periods that include an LHB period. In embodiments where the scan driving circuit $121_{i-1}$ is configured to assert the gate scan signal G(i−1) in a horizontal sync period that includes an LHB period and the scan driving circuit $121_i$ is configured to assert the gate scan signal G(i) in the next horizontal sync period, a dummy scan driving circuit 123 may be disposed between scan driving circuits $121_{i-1}$ and $121_i$ to generate a dummy gate scan signal G_dummy(i−1) that controls initialization of pixel circuits 140 of display line #i.

Figure 7:
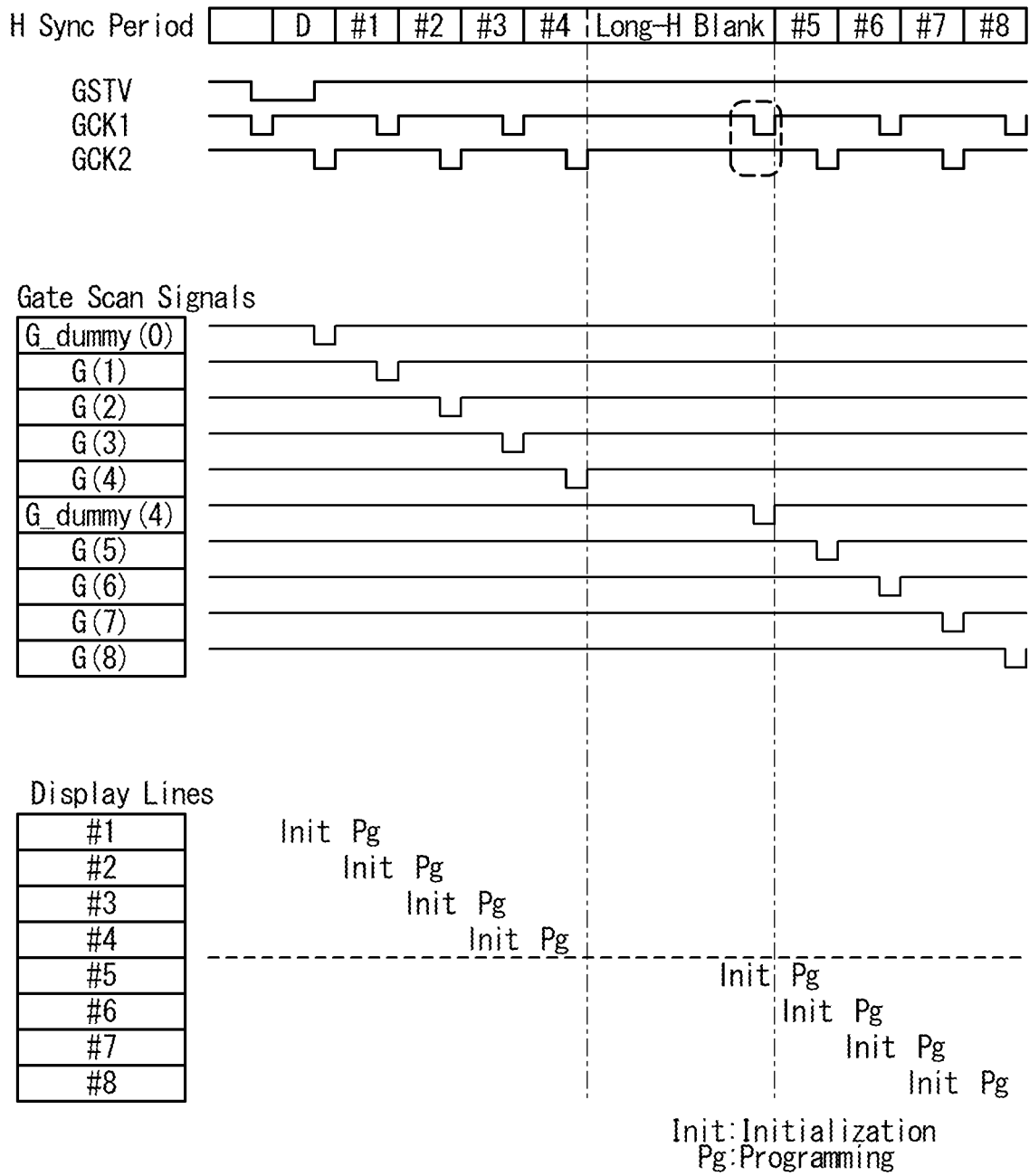
FIG. 7 illustrates an example operation of the display panel, according to one or more embodiments.

FIG. 7 illustrates an example operation of the display panel 100 illustrated in FIGS. 4-6, according to one or more embodiments. In the illustrated embodiment, the pixel circuits 140 of display line #i are programmed in horizontal sync period #i, and horizontal sync period #4 includes an LHB period. Horizontal sync period D is the horizontal sync period immediately before horizontal sync period #1. In FIG. 7, the gate scan start pulse signal GSTV, the gate scan shift clocks GCK1 and GCK2 are illustrated as low-active signals.

The dummy gate scan signal G_dummy(0) is asserted by the dummy scan driving circuit 122 in horizontal sync period D in response to the assertion of the gate scan start pulse signal GSTV in synchronization with the gate scan shift clocks GCK1 and GCK2. In response to the assertion of the dummy gate scan signal G_dummy(0), the pixel circuits 140 of display line #1 are initialized in horizontal sync period D.

The gate scan signals G(1), G(2), and G(3) are then sequentially asserted by the scan driving circuits $121_1$, $121_2$, and $121_3$ in horizontal sync period #1, #2, and #3, respectively, in synchronization with the gate scan shift clocks GCK1 and GCK2. The gate scan signals G(1), G(2), and G(3) may be asserted in the display update periods of the horizontal sync period #1, #2, and #3, respectively. The gate scan signals G(1), G(2), and G(3) are each asserted in response to an assertion of one of the gate scan shift clocks GCK1 and GCK2. In the illustrated embodiment, the gate scan signals G(1) and G(3) are asserted upon the assertion of the gate scan shift clocks GCK1 and the gate scan signal G(2) is asserted upon the assertion of the gate scan shift clocks GCK2.

In response to the assertions of the gate scan signals G(1), G(2), and G(3), the pixel circuits 140 of display lines #1, #2, and #3 are programmed in horizontal sync period #1, #2, and #3, respectively. The sequential assertions of the gate scan signals G(1), G(2), and G(3) also cause initializations of the pixel circuits 140 of display lines #2, #3, and #4 in horizontal sync period #1, #2, and #3, respectively.

The gate scan signal G(4) is asserted by the scan driving circuit $121_4$ in the following horizontal sync period #4. The gate scan signal G(4) may be asserted in the display update period of the horizontal sync period #4. In response to the assertion of the gate scan signal G(4), the pixel circuits 140 of display lines #4 are programmed in horizontal sync period #4. The assertion of the gate scan signal G(4) does not cause initialization of the pixel circuits 140 of display line #5, since the gate scan signal G(4) is not supplied to the pixel circuits 140 of display line #5.

The dummy gate scan signal G_dummy(4) is then asserted by the dummy scan driving circuit 123 in the LHB period of horizontal sync period #4. The dummy scan signal G_dummy(4) may be asserted at or near the end of the LHB period. The assertion of the dummy gate scan signal G_dummy(4) causes initialization of the pixel circuits 140 of display line #5. The assertions of the gate scan signal G(4) and the dummy gate scan signal G_dummy(4) are synchronous with the gate scan shift clocks GCK1 and GCK2. In the illustrated embodiment, the gate scan signal G(4) is asserted in response to an assertion of the gate scan shift clock GCK2, and the dummy gate scan signal G_dummy(4) is asserted in response to an assertion of the gate scan shift clock GCK1.

This is followed by asserting gate scan signal G(5) by the scan driving circuit $121_5$ in horizontal sync period #5. The gate scan signal G(5) may be asserted in the display update period of the horizontal sync period #5. In response to the assertion of the gate scan signal G(5), the pixel circuits 140 of display lines #5 are programmed in horizontal sync period #5. The initialization of the pixel circuits 140 of display line #5 at or near the end of the LHB period of horizontal sync period #4 shortens the time duration between initialization and programming of the pixel circuits 140 of display line #5, reducing the charge leakage from the pixel circuits 140 of display line #5. This effectively suppresses or avoids undesired brightness unevenness or artifact at display line #5. The assertion of the gate scan signal G(5) also causes initialization of the pixel circuits 140 of display line #6.

The gate scan signals G(6), G(7), and G(8) are then sequentially asserted by the scan driving circuits $121_6$, $121_7$, and $121_8$ in horizontal sync period #6, #7, and #8, respectively, in synchronization with the gate scan shift clocks GCK1 and GCK2. The gate scan signals G(6), G(7), and G(8) may be asserted in the display update periods of the horizontal sync period #6, #7, and #8, respectively. In response to the assertions of the gate scan signals G(6), G(7), and G(8), the pixel circuits 140 of display lines #6, #7, and #8 are programmed in horizontal sync period #6, #7, and #8, respectively. The sequential assertions of the gate scan signals G(6), G(7), and G(8) also causes initialization of the pixel circuits 140 of display lines #7, #8, and #9 in horizontal sync period #6, #7, and #8, respectively.

Referring back to FIG. 6, the scan driving circuits 121 and the dummy scan driving circuits 122 and 123 may each include bootstrap circuitry to generate the associated gate scan signal G or dummy scan signal G_dummy. The use of the bootstrap circuitry may enable generating the gate scan signal G or dummy scan signal G_dummy with an increased amplitude, which may help fully switching select transistors that receive the gate scan signal G or dummy scan signal G_dummy in pixel circuits 140 of the associated display line 110.

Figure 8:
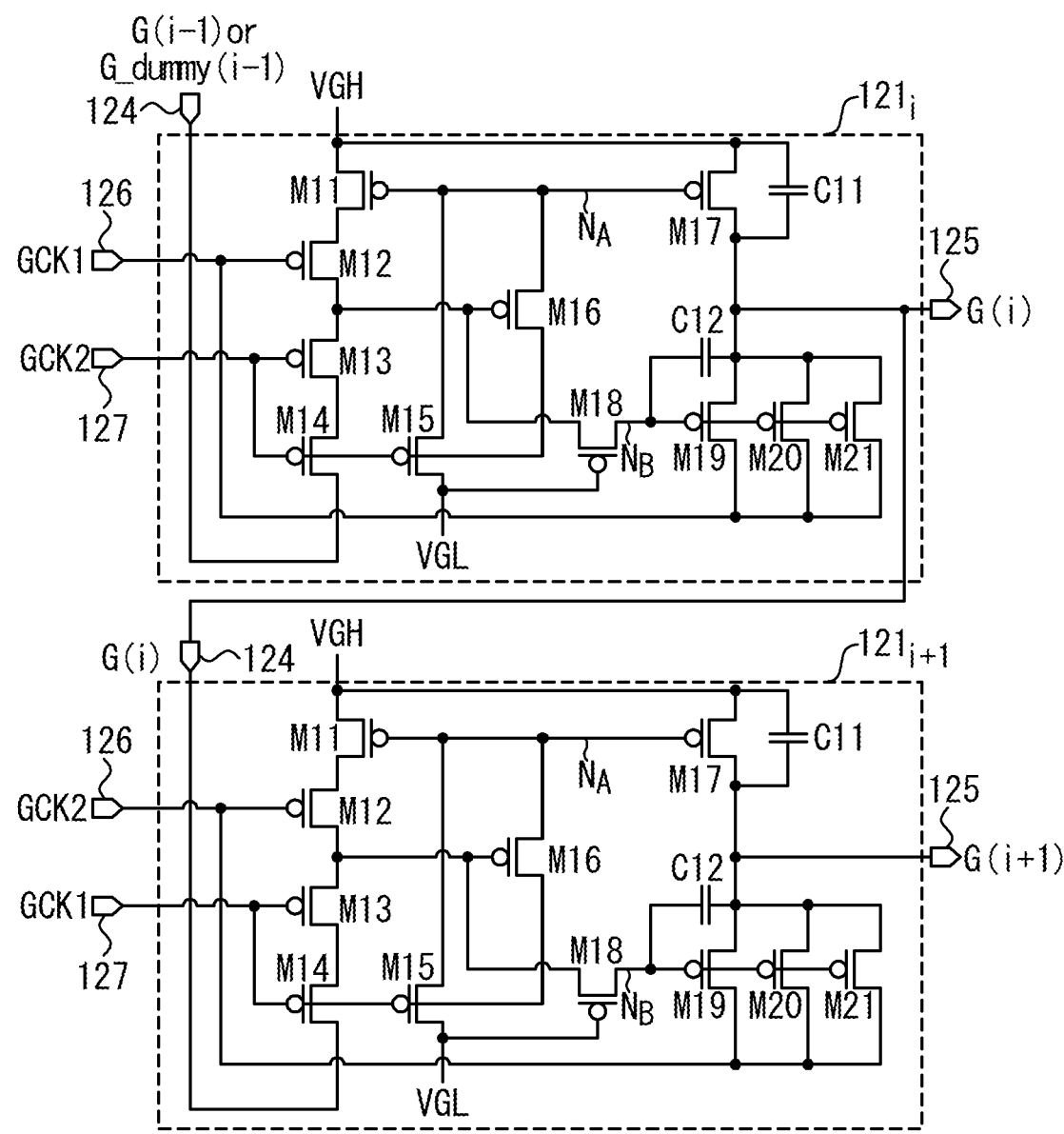
FIG. 8 illustrates an example configuration of scan driving circuits that include bootstrap circuitry, according to one or more embodiments.

FIG. 8 illustrates an example configuration of scan driving circuits $121_i$ and $121_{i+1}$ that include bootstrap circuitry, according to one or more embodiments. In the illustrated embodiment, the scan driving circuits $121_i$ includes an input terminal 124, an output terminal 125, a pair of clock inputs 126, 127, PMOS transistors M11 to M21, and capacitors C11 and C12. The input terminal 124 of the scan driving circuits $121_i$ is configured to receive the gate scan signal G(i−1) or dummy gate scan signal G(i−1), and the clock inputs 126 and 127 are configured to receive the gate scan shift clocks GCK1 and GCK2, respectively. The PMOS transistors M11, M12, M13, and M14 are connected in series between the input terminal 124 and a high-side power source VGH configured to generate a positive power source voltage. The PMOS transistor M11 has a gate connected to a node $N_A$. The PMOS transistor M12 has a gate connected to the clock input 126, and the PMOS transistors M13 and M14 have gates commonly-connected to the clock input 127. The PMOS transistor M15 is connected between the node $N_A$ and a low-side power source VGL configured to generate a negative power source voltage. The PMOS transistor M15 has a gate connected to the commonly connected gates of the PMOS transistors M13 and M14 and the clock input 127. The PMOS transistor M16 is connected between the node $N_A$ and the commonly-connected gates of the PMOS transistors M13, M14 and M15. The PMOS transistor M16 has a gate connected to the drain of the PMOS transistor M12. The PMOS transistor M17 is connected between the high-side power source VGH and the output terminal 125. The PMOS transistor M17 has a gate connected to the node $N_A$. The PMOS transistor M18 is connected between the gate of the PMOS transistor M16 and a node $N_B$. The PMOS transistor M18 has a gate connected to the low-side power source VGL. The PMOS transistors M19, M20, and M21 have sources commonly-connected to the output terminal 125, gates commonly-connected to the node $N_B$, and sources commonly-connected to the clock input 126. The capacitor C11 is connected between the drain and source of the PMOS transistor M17, and the capacitor C12 is connected between the commonly-connected gates and commonly-connected sources of the PMOS transistors M19, M20, and M21.

The scan driving circuit $121_{i+1}$ is configured similarly to the scan driving circuit $121_i$ except for that the input terminal 124 is configured to receive the gate scan signal G(i), and the clock inputs 126 and 127 are configured to receive the gate scan shift clocks GCK2 and GCK1, respectively. The dummy scan driving circuits 122 and 123 may be configured similarly to the scan driving circuits $121_i$ and $121_{i+1}$ illustrated in FIG. 8.

The scan driving circuits $121_i$ and $121_{i+1}$ are each configured to accumulate electric charges on the nodes $N_A$ and $N_B$ using the associated gate scan signal G or dummy gate scan signal G_dummy in response to an assertion of one of the gate scan shift clocks GCK1 and GCK2. The scan driving circuits $121_i$ and $121_{i+1}$ are further configured to boost the gate scan signals G(i) and G(i–1) using the accumulated electric charges in response to an assertion of the other of the gate scan shift clocks GCK1 and GCK2. In such embodiments, charge leakage from the nodes NA and NB may occur during an LHB period of a horizontal sync period. The charge leakage may reduce the amplitude of the gate scan signal G(i) or G(i–1) associated with the horizontal sync period, causing brightness evenness or artifact. The following description provides various embodiments to mitigate an effect of charge leakage from the scan driving circuits 121 as well as the charge leakage from the pixel circuits 140.

Figure 9:
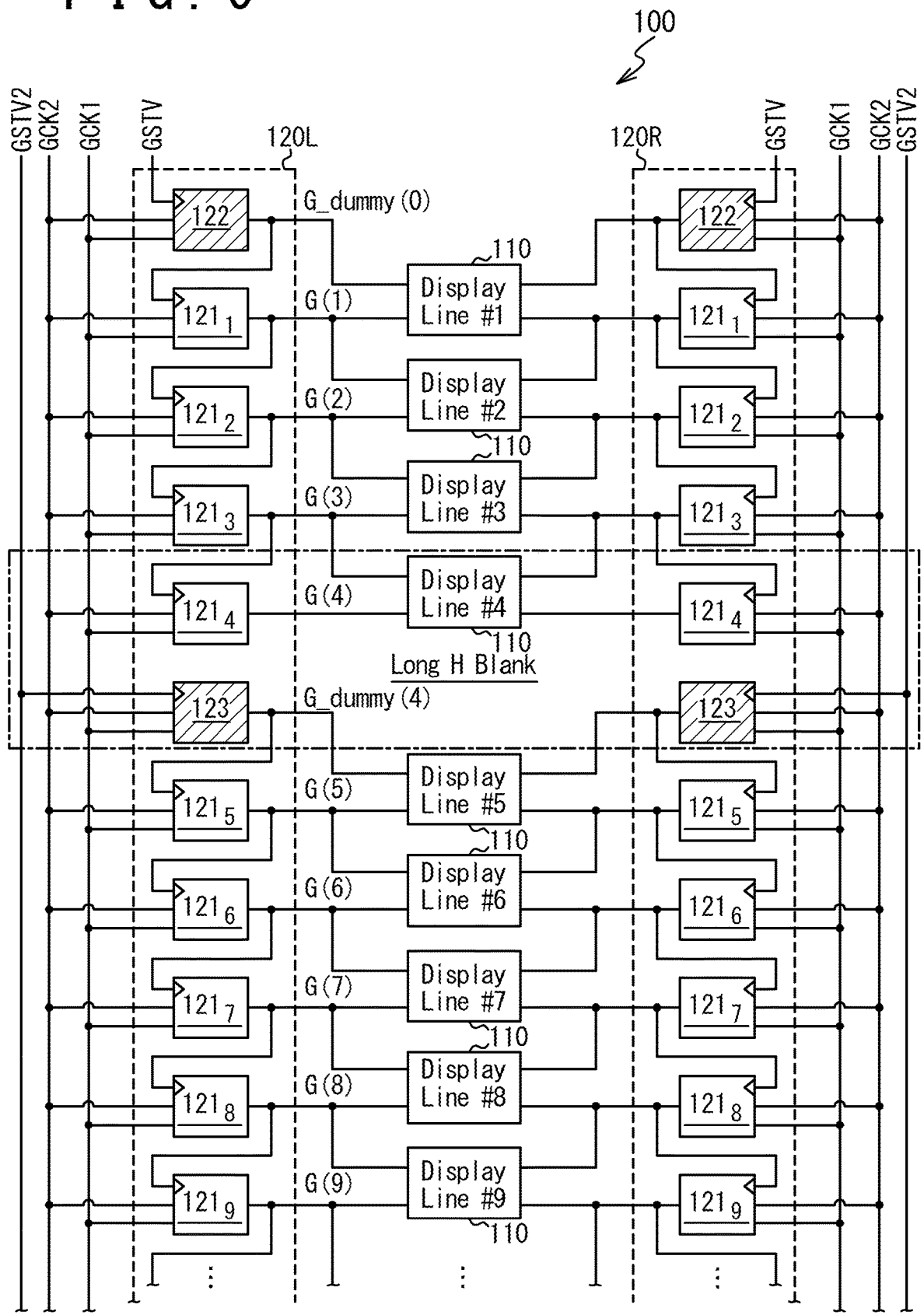
FIG. 9 illustrates an example configuration of a display panel, according to one or more embodiments.

FIG. 9 illustrates an example configuration of the display panel 100, according to one or more embodiments. In the illustrated embodiment, the dummy scan driving circuit 123 of each of the gate scan drivers 120L and 120R is configured to receive a gate scan start pulse signal GSTV2 in place of the gate scan signal G(4) and generate the dummy gate scan signal G_dummy(4) using the gate scan start pulse signal GSTV2. In one implementation, the gate scan start pulse signal GSTV2 supplied to the dummy scan driving circuit 123 of the left-side gate scan driver 120L is generated by the left-side panel interface 420L of the display driver 400, and the gate scan start pulse signal GSTV2 supplied to the dummy scan driving circuit 123 of the right-side gate scan driver 120R is generated by the right-side panel interface 420R.

Figure 10:
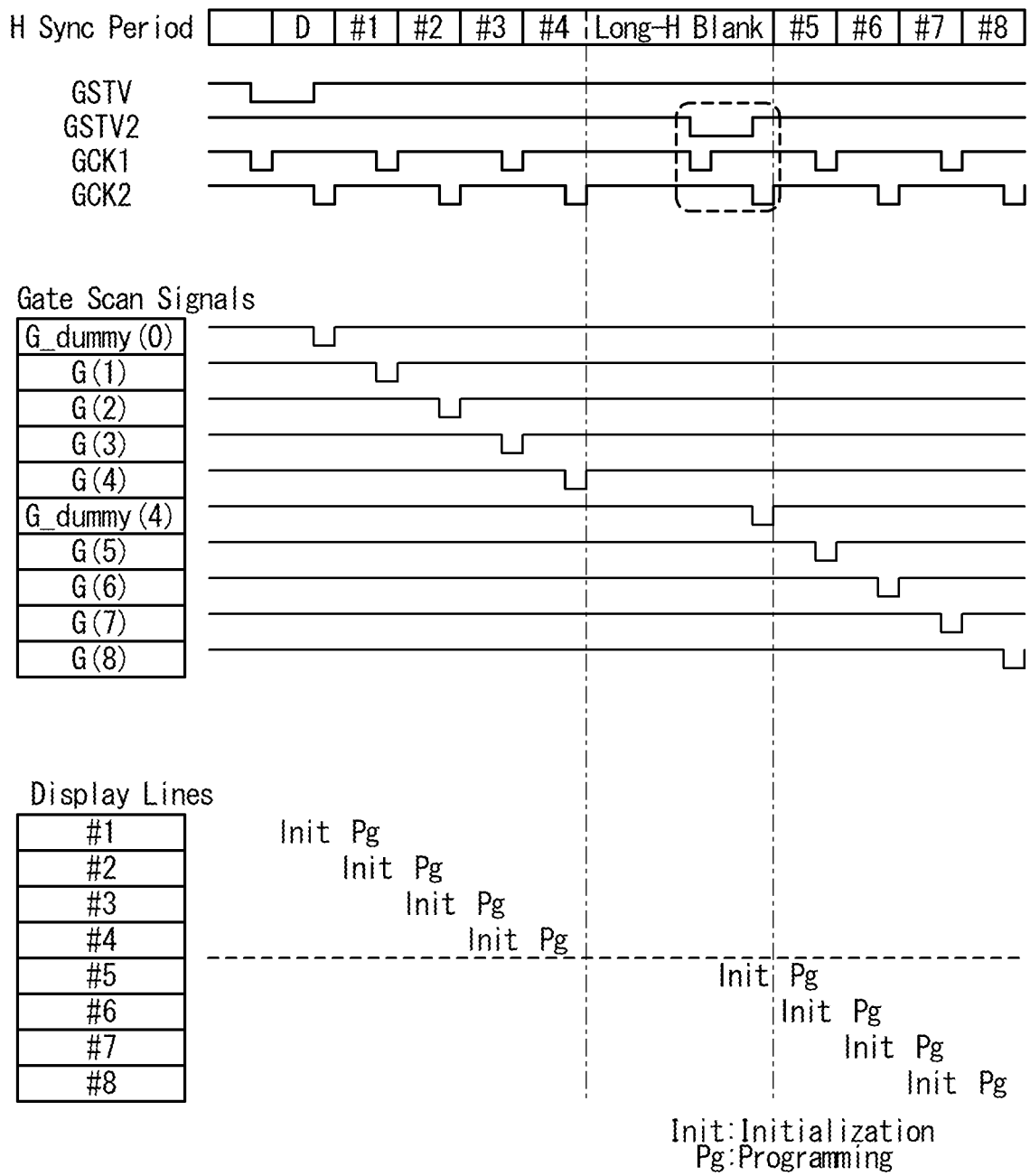
FIG. 10 illustrates an example operation of a display panel, according to one or more embodiments.

FIG. 10 illustrates an example operation of the display panel 100 illustrated in FIG. 9, according to one or more embodiments. In the illustrated embodiment, horizontal sync period #4 includes an LHB period, and the gate scan start pulse signal GSTV2 is a low-active signal. The gate scan start pulse signal GSTV2 is asserted in the LHB period, and the dummy scan driving circuit 123 of each of the gate scan drivers 120L and 120R accumulates electric charges using the gate scan start pulse signal GSTV2 in response to an assertion of the gate scan shift clock GCK1 in the LHB period. The assertion timing of the gate scan start pulse signal GSTV2 and the gate scan shift clocks GCK1 may be near the end of the LHB period.

This is followed by asserting the dummy gate scan signal G_dummy(4) in response to an assertion of the gate scan shift clocks GCK2 in the LHB period. The assertion of the dummy gate scan signal G_dummy(4) causes initialization of the pixel circuits 140 of display line #5. The assertion timing of the gate scan shift clocks GCK2 may be at or near the end of the LHB period. The dummy gate scan signal G_dummy(4) is boosted using the electric charges accumulated in the dummy scan driving circuit 123 during the assertion of the dummy gate scan signal G_dummy(4). The use of the gate scan start pulse signal GSTV2 shortens the time duration between the charge accumulation and the assertion of the dummy gate scan signal G_dummy(4), suppressing charge leakage from the dummy scan driving circuit 123. This effectively enlarges the amplitude of the dummy gate scan signal G_dummy(4).

The gate scan signal G(5) is then asserted by the scan driving circuit $121_5$ in horizontal sync period #5. In response to the assertion of the gate scan signal G(5), the pixel circuits 140 of display lines #5 are programmed in horizontal sync period #5. The initialization of the pixel circuits 140 of display line #5 at or near the end of the LHB period of horizontal sync period #4 shortens the time duration between initialization and programming of the pixel circuits 140 of display line #5, reducing the charge leakage from the pixel circuits 140 of display line #5.

While only one dummy scan driving circuit 123 is illustrated for each of the left-side gate scan driver 120L and the right-side gate scan driver 120R in FIG. 9, the number and locations of dummy scan driving circuits 123 may be modified based on locations of horizontal sync periods that include an LHB period. In embodiments where a plurality of dummy scan driving circuits 123 are disposed in each of the left-side gate scan driver 120L and the right-side gate scan driver 120R, the same number of gate scan start pulse signals GSTV2, GSTV3, . . . are generated by the display driver 400 and supplied to the plurality of dummy scan driving circuits 123, respectively. For example, when N dummy scan driving circuits 123 are disposed in each of the left-side gate scan driver 120L and the right-side gate scan driver 120R, each of the left-side panel interface 420L and the right-side panel interface 420R is configured to additionally generate and supply N gate scan start pulse signals GSTV2 to GSTV(N+1) to the N dummy scan driving circuits 123, respectively.

Figure 11:
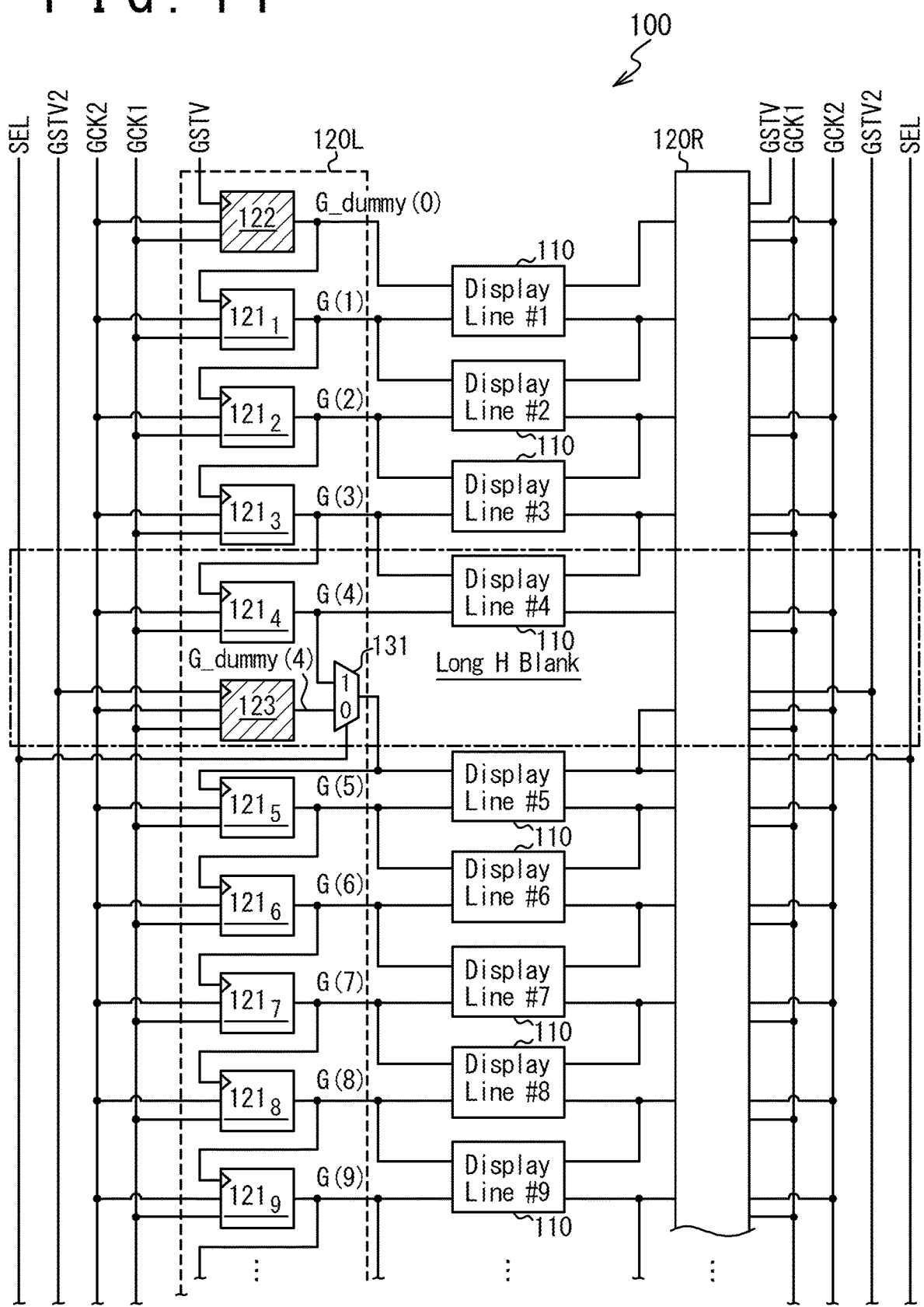
FIG. 11 illustrates an example configuration of a display panel, according to one or more embodiments.

FIG. 11 illustrates an example configuration of the display panel 100, according to other embodiments. In the illustrated embodiment, the left-side gate scan driver 120L further includes one or more selectors 131 (one illustrated) each connected to the outputs of a scan driving circuit 121 and a dummy scan driving circuit 123. The right-side gate scan driver 120R may be configured identically to the left-side gate scan driver 120L. In FIG. 11, a selector 131 is connected to the outputs of the scan driving circuit $121_4$ and the dummy scan driving circuit 123. The selector 131 is configured to select the gate scan signal G(4) and the dummy gate scan signal G_dummy(4) based on a select signal SEL received from the display driver 400 and supply the selected gate scan signal to the pixel circuits 140 of display line #5. The pixel circuits 140 of display line #5 are initialized in response to the selected gate scan signal. In one implementation, the selector 131 is configured to output the dummy gate scan signal G_dummy(4) when the select signal SEL is "0", for example, and output the gate scan signal G(4) when the select signal SEL is "1."

This configuration of the display panel 100 is adapted to an operation in which no LHB period is disposed. When an operation in which horizontal sync period #4 includes an LHB period is desired, the select signal SEL is set to "0." This causes the selector 131 to supply the dummy gate scan signal G_dummy(4) to the pixel circuits 140 of display line #5. When an operation in which no LHB period is disposed is desired, the select signal SEL is set to "1." This causes the selector 131 to supply the gate scan signal G(4) to the pixel circuits 140 of display line #5. The use of the selector 131 eliminates a need for driving the gate scan start pulse signal GSTV2 when no LHB period is disposed, reducing the power consumption of the display driver 400. Although the configuration illustrated in FIG. 9 is also adapted to an operation in which no LHB period is disposed, the configuration illustrated in FIG. 9 requires driving of the gate scan start pulse signal GSTV2.

Figure 12:
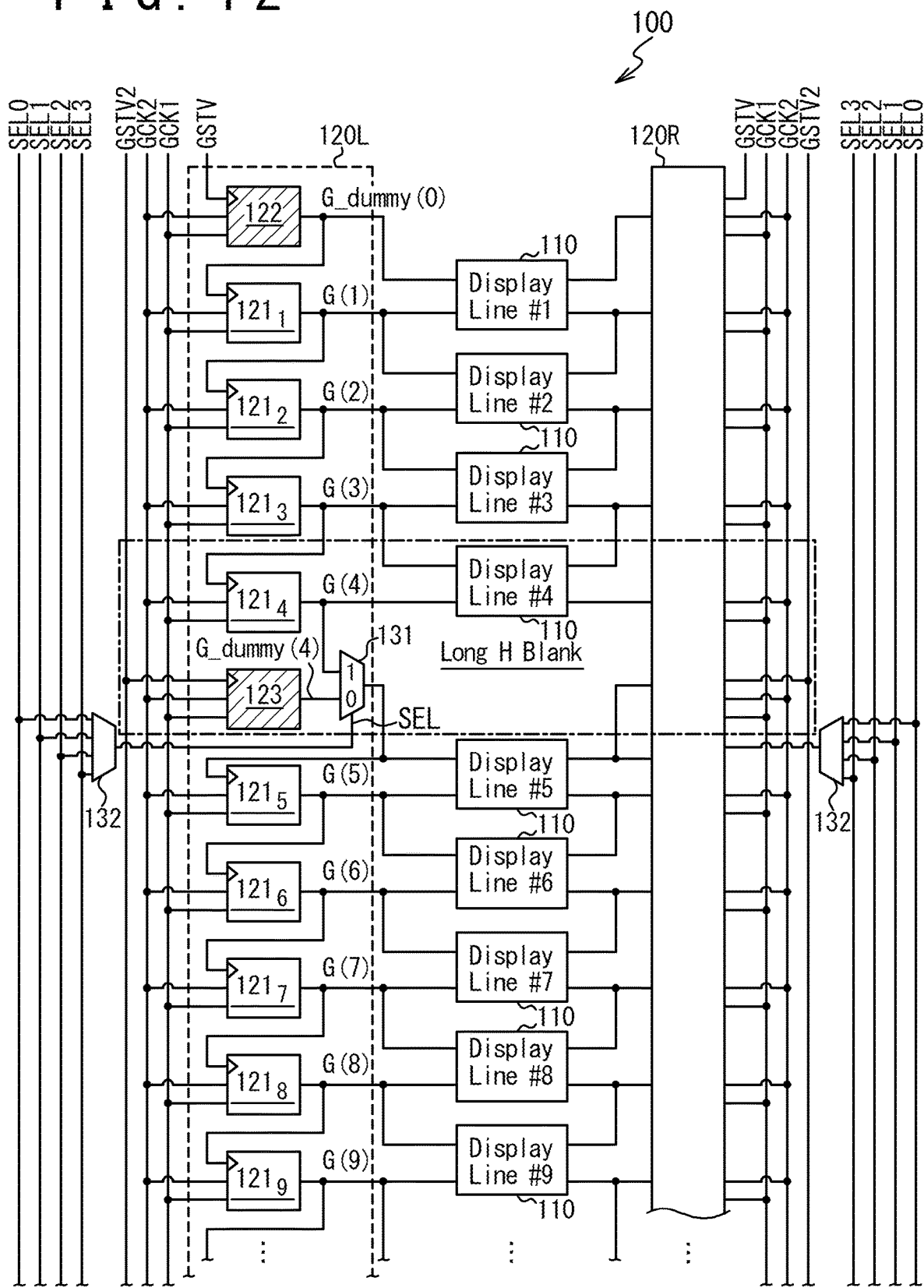
FIG. 12 illustrates an example configuration of a display panel, according to one or more embodiments.

FIG. 12 illustrates an example configuration of the display panel 100, according to still other embodiments. In the illustrated embodiment, the display panel 100 further includes decoders 132 (one illustrated) associated with the selectors 131 (one illustrated), respectively. Each decoder 132 is configured to receive a plurality of select signals, four select signals SEL0 to SEL3 in the illustrated embodiment, and decode the select signals SEL0 to SEL3 to generate a resultant select signal SEL supplied to the associated selector 131.

The configuration illustrated in FIG. 12 suppresses an increase in additional signals to be supplied to the display panel 100 when the number of the LHB periods in each frame period (or each vertical sync period) is increased. In the configuration illustrated in FIG. 9, the number of additional gate scan start pulse signal GSTV2, GSTV3, GSTV4 . . . is identical to the number of the LHB periods disposed in each frame period. For example, when the number of the LHB periods in each frame period is 16, the number of additional signals (that is, the gate scan start pulse signals GSTV2, GSTV3, GSTV4 . . . ) to be supplied to the display panel 100 is 16 for the configuration illustrated in FIG. 9, while the configuration illustrated in FIG. 12 reduces the number of the additional signals (that is, the select signals SEL0 to SEL4, and the gate scan start pulse signal GSTV2) to five.

Figure 13:
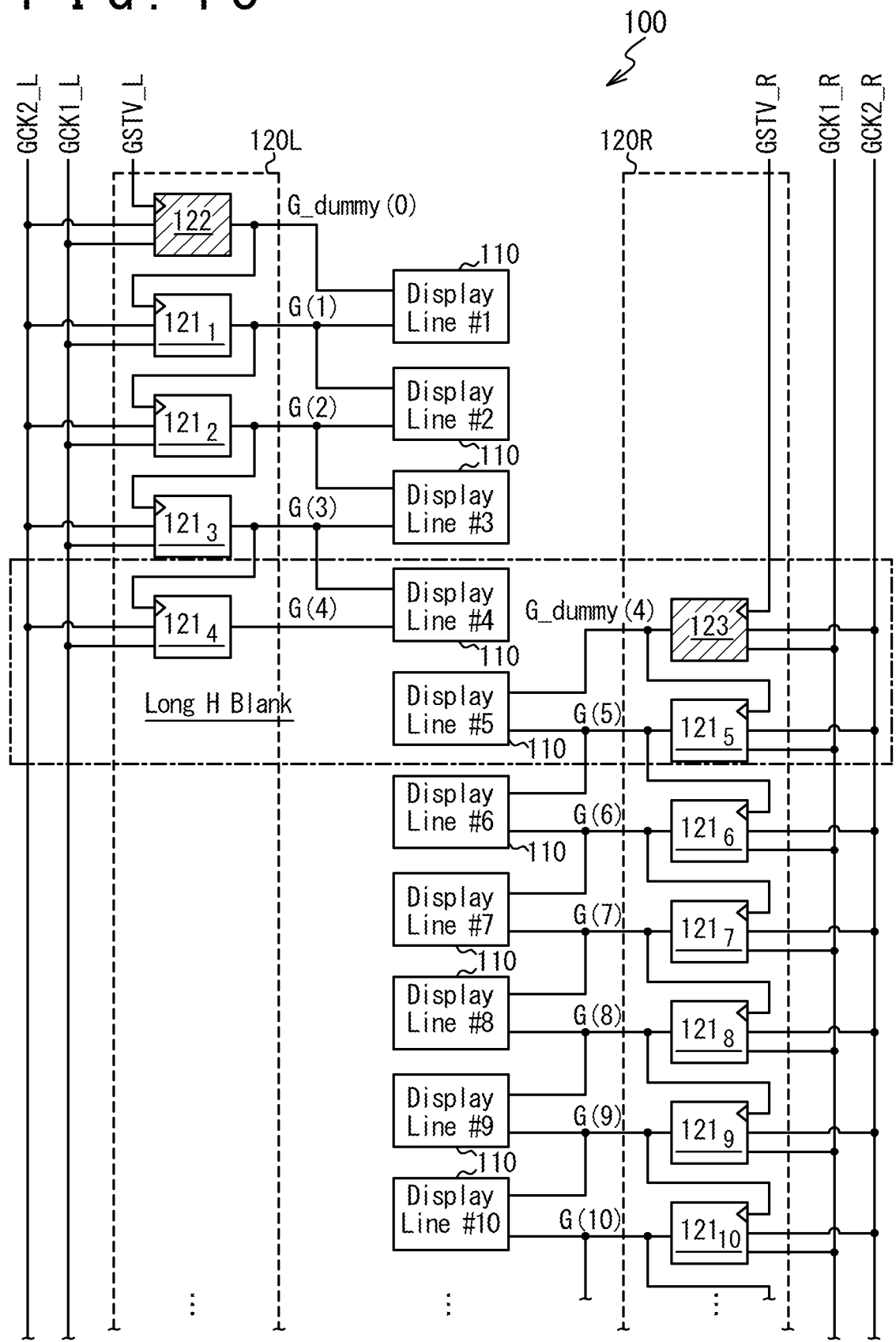
FIG. 13 illustrates an example configuration of a display panel, according to one or more embodiments.

FIG. 13 illustrates an example configuration of the display panel 100, according to still other embodiments. In the illustrated embodiment, each display line 110 is configured to receive a pair of gate scan signals G (or a dummy gate scan signal G_dummy and a gate scan signal G) from only one of the left-side gate scan driver 120L and the right-side gate scan driver 120R. The left-side gate scan driver 120L and the right-side gate scan driver 120R are configured to operate independently of each other. The left-side gate scan driver 120L is configured to receive a left-side gate scan start pulse signal GSTV_L and left-side gate scan shift clocks GCK1_L and GCK2_L from the left-side panel interface 420L (illustrated in FIG. 4), and the right-side gate scan driver 120R is configured to receive a right-side gate scan start pulse signal GSTV_R and right-side gate scan shift clocks GCK1_R and GCK2_R from the right-side panel interface 420R.

In the illustrated embodiment, the left-side gate scan driver 120L includes a dummy scan driving circuit 122 and scan driving circuits $121_1$ to $121_4$. The dummy scan driving circuit 122 is configured to generate a dummy gate scan signal G_dummy(0) in response to the left-side gate scan start pulse signal GSTV_L in synchronization with the left-side gate scan shift clocks GCK1_L and GCK2_L. The scan driving circuits $121_1$ to $121_4$ are serially connected and configured to generate gate scan signals G(1) to G(4), respectively, in synchronization with the left-side gate scan shift clocks GCK1_L and GCK2_L. The pixel circuits 140 of display line #1 are initialized in response to the dummy gate scan signal G_dummy(0), and the pixel circuits 140 of display lines #2, #3, and #4 are initialized in response to the gate scan signals G(1), G(2), and G(3), respectively, while the pixel circuits 140 of display lines #1 to #4 are programmed in response to the gate scan signals G(1) to G(4), respectively. It should be noted that the right-side gate scan driver 120R does not include scan driving circuits 121 that supply gate scan signals G to display lines #1 to #4.

In the illustrated embodiment, the right-side gate scan driver 120R includes a dummy scan driving circuit 123 and scan driving circuits $121_5$ to $121_{10}$. The dummy scan driving circuit 123 is configured to generate a dummy gate scan signal G_dummy(4) in response to the right-side gate scan start pulse signal GSTV_R in synchronization with the right-side gate scan shift clocks GCK1_R and GCK2_R. The scan driving circuits $121_5$ to $121_{10}$ are serially connected and configured to generate gate scan signals G(5) to G(10), respectively, in synchronization with the right-side gate scan shift clocks GCK1_R and GCK2_R. The pixel circuits 140 of display line #5 are initialized in response to the dummy gate scan signal G_dummy(4), and the pixel circuits 140 of display lines #6 to #10 are initialized in response to the gate scan signals G(5) to G(9), respectively, while the pixel circuits 140 of display lines #5 to #10 are programmed in response to the gate scan signals G(5) to G(10), respectively. It should be noted that the left-side gate scan driver 120L does not include scan driving circuits 121 that supply gate scan signals G to display lines #5 to #10.

The configuration illustrated in FIG. 13 allows disposing the dummy scan driving circuit 123 without increasing the areas occupied by the left-side gate scan driver 120L and the right-side gate scan driver 120R.

The configuration illustrated in FIG. 13 also suppresses an increase in the number of gate scan start pulse signals GSTV when the number of LHB periods in each frame period is increased. The configuration illustrated in FIG. 13 reduces the total number of gate scan start pulse signals GSTV to the half of those in the configuration illustrated in FIG. 9 for the same number of LHB periods in each frame period.

Figure 14:
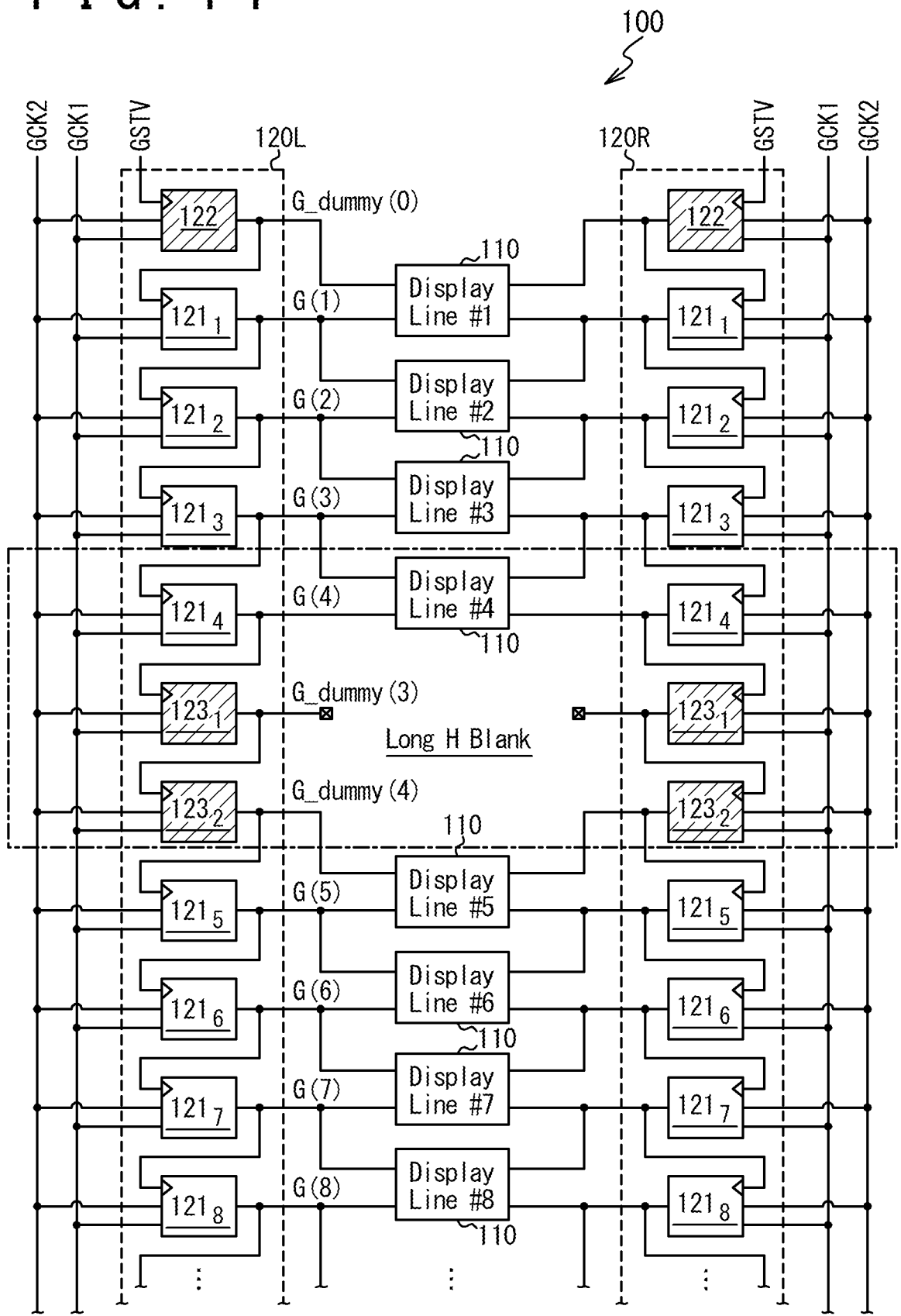
FIG. 14 illustrates an example configuration of a display panel, according to one or more embodiments.

FIG. 14 illustrates an example configuration of the display panel 100, according to still other embodiments. In the illustrated embodiment, a pair of serially-connected dummy scan driving circuits 123 are disposed in each of the left-side gate scan driver 120L and the right-side gate scan driver 120R. The serially-connected dummy scan driving circuits 123 may each include bootstrap circuitry configured to generate the associated dummy gate scan signal G_dummy using a gate scan signal G or a different dummy gate scan signal G_dummy. In the illustrated embodiment, a dummy scan driving circuit $123_1$ is configured to generate a dummy gate scan signal G_dummy(3) using the gate scan signal G(4) received from the scan driving circuit $121_4$, and a dummy scan driving circuit $123_2$ is configured to generate the dummy gate scan signal G_dummy(4) using the dummy gate scan signal G_dummy(3).

Figure 15:
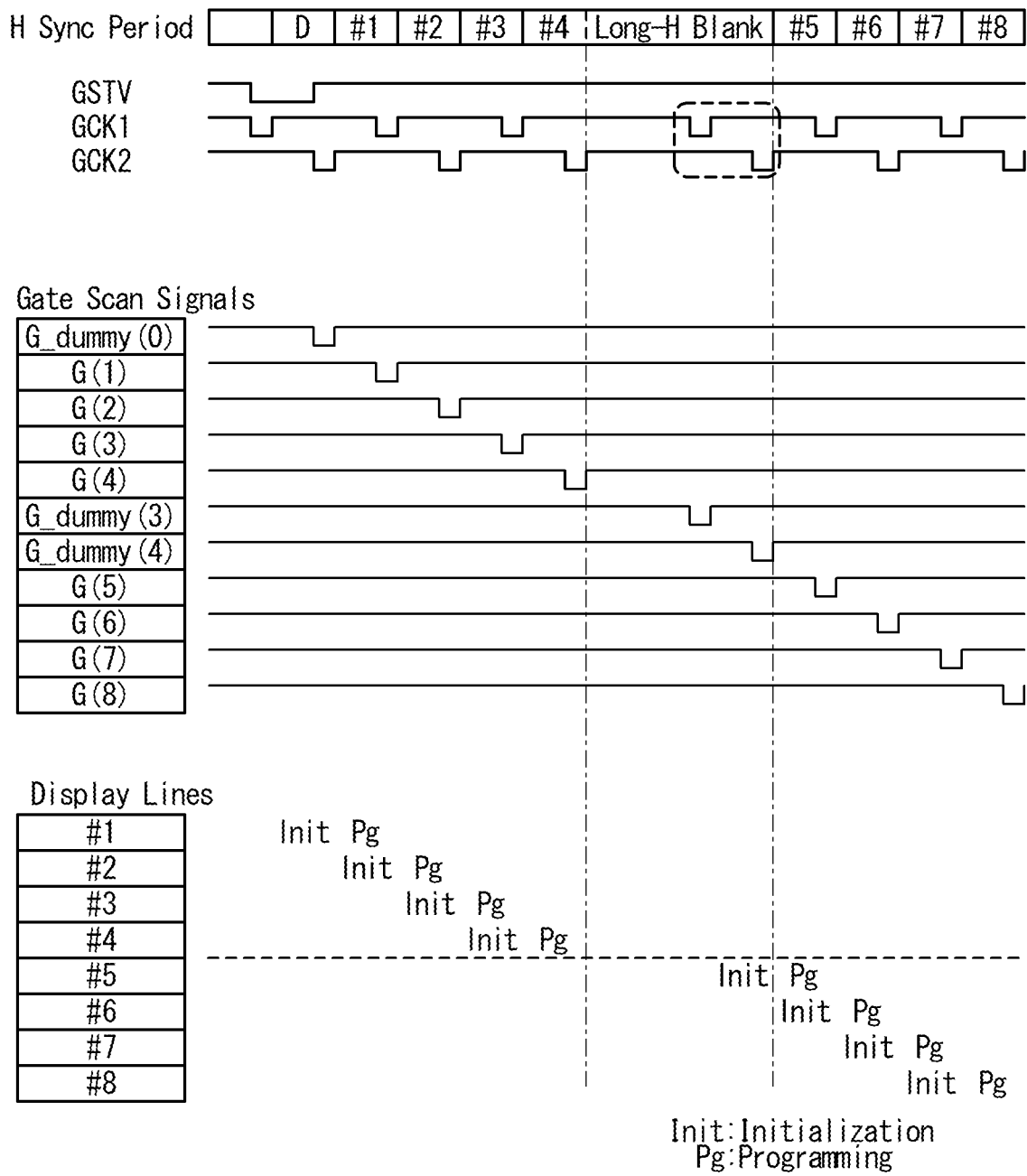
FIG. 15 illustrates an example operation of a display panel, according to one or more embodiments.

FIG. 15 illustrates an example operation of the display panel 100 illustrated in FIG. 14, according to one or more embodiments. In the illustrated embodiment, horizontal sync period #4 includes an LHB period. The scan driving circuit $121_4$ asserts the gate scan signal G(4) in the display update period of horizontal sync period #4 in response to an assertion of the gate scan shift clocks GCK2. Subsequently, the dummy scan driving circuit $123_1$ asserts the dummy gate scan signal G_dummy(3) in the LHB period of horizontal sync period #4 in response to an assertion of the gate scan shift clocks GCK1. The dummy scan driving circuit $123_2$ accumulates electric charges therein using the dummy gate scan signal G_dummy(3) received from the dummy scan driving circuit $123_1$. The assertion timing of the dummy gate scan signal G_dummy(3) may be near the end of the LHB period. The dummy scan driving circuit $123_2$ then asserts the dummy gate scan signal G_dummy(4) in response to an assertion of the gate scan shift clocks GCK2. The assertion timing of the dummy gate scan signal G_dummy(4) may be at or near the end of the LHB period. The assertion of the dummy gate scan signal G_dummy(4) causes initialization of the pixel circuits 140 of display line #5.

The dummy scan driving circuit $123_2$ is configured to boost the dummy gate scan signal G_dummy(4) using the electric charges accumulated by using the dummy gate scan signal G_dummy(3). This operation enables shortening the time duration between the charge accumulation and the assertion of the dummy gate scan signal G_dummy(4), reducing charge leakage from the dummy scan driving circuit $123_2$. This effectively increases the amplitude the dummy gate scan signal G_dummy(4), suppressing or avoiding brightness unevenness or artifact at display line #5.

The gate scan signal G(5) is then asserted by the scan driving circuit $121_5$ in horizontal sync period #5. In response to the assertion of the gate scan signal G(5), the pixel circuits 140 of display lines #5 are programmed in horizontal sync period #5. The initialization of the pixel circuits 140 of display line #5 at or near the end of the LHB period of horizontal sync period #4 shortens the time duration between initialization and programming of the pixel circuits 140 of display line #5, reducing the charge leakage from the pixel circuits 140 of display line #5. This effectively suppresses or avoids brightness unevenness or artifact at display line #5.

While only one pair of serially-connected dummy scan driving circuits 123 is illustrated for each of the left-side gate scan driver 120L and the right-side gate scan driver 120R in FIG. 14, the number and locations of pairs of serially-connected dummy scan driving circuits 123 may be modified based on locations of horizontal sync periods that include an LHB period. In embodiments where the scan driving circuit $121_{k-1}$ is configured to assert the gate scan signal G(k-1) in a horizontal sync period that includes an LHB period and the scan driving circuit $121_k$ is configured to assert the gate scan signal G(k) in the next horizontal sync period, a pair of serially-connected dummy scan driving circuits 123 may be disposed between scan driving circuits $121_{k-1}$ and $121_k$ to generate a dummy gate scan signal G_dummy(k-1) that controls initialization of pixel circuits 140 of display line #k, where k is an natural number of two or more.

Figure 16:
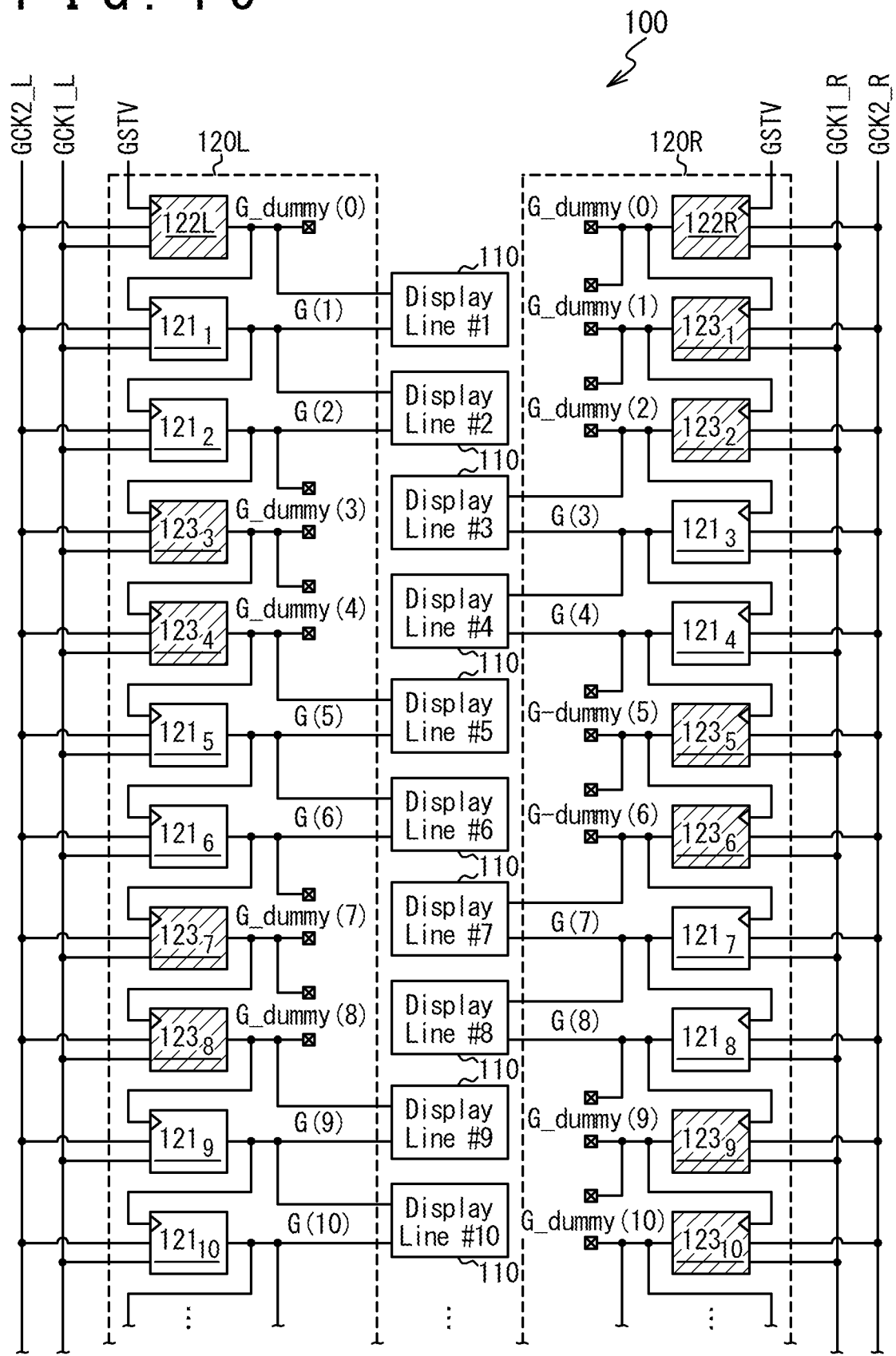
FIG. 16 illustrates an example configuration of a display panel, according to one or more embodiments.

FIG. 16 an example configuration of the display panel 100, according to still other embodiments. In the illustrated embodiment, each display line 110 is configured to receive a pair of gate scan signals G (or a dummy gate scan signal G_dummy and a gate scan signal G) from only one of the left-side gate scan driver 120L and the right-side gate scan driver 120R. The left-side gate scan driver 120L and the right-side gate scan driver 120R are configured to alternately supply gate scan signals G and dummy scan signals G_dummy to the display lines 110 in units of two display lines 110.

The left-side gate scan driver 120L and the right-side gate scan driver 120R are configured to operate with different operation timings. The left-side gate scan driver 120L is configured to receive left-side gate scan shift clocks GCK1_L and GCK2_L from the left-side panel interface 420L (illustrated in FIG. 4), and the right-side gate scan driver 120R is configured to receive right-side gate scan shift clocks GCK1_R and GCK2_R from the right-side panel interface 420R. The right-side gate scan shift clocks GCK1_R and GCK2_R may be generated independently of the left-side gate scan shift clocks GCK1_L and GCK2_L.

The left-side gate scan driver 120L includes a dummy scan driving circuit 122L, a plurality of pairs of scan driving circuits 121 and a plurality of pairs of dummy scan driving circuits 123. Each pair of the scan driving circuits 121 are connected in series, and each pair of the dummy scan driving circuits 123 are connected in series. The dummy scan driving circuit 122L is configured to generate a dummy gate scan signal G_dummy(0), and the pairs of scan driving circuits 121 and the pairs of dummy scan driving circuits 123 are alternately connected in series to the output of the dummy scan driving circuit 122L. In the illustrated embodiment, the left-side gate scan driver 120L includes scan driving circuits $121_1$, $121_2$, $121_5$, $121_6$, $121_9$, and $121_{10}$, configured to generate gate scan signals G(1), G(2), G(5), G(6), G(9), and G(10), respectively, and dummy scan driving circuits $123_3$, $123_4$, $123_7$, and $123_8$ configured to generate dummy gate scan signals G_dummy(3), G_dummy(4), G_dummy(7), and G_dummy(8), respectively. The dummy gate scan signals G_dummy(0) and the gate scan signal G(1) are used to control initialization of pixel circuits 140 of display lines #1 and #2, respectively, and the gate scan signals G(1) and G(2) are used to control programming of pixel circuits 140 of display lines #1 and #2. The dummy gate scan signals G_dummy(4) and the gate scan signal G(5) are used to control initialization of pixel circuits 140 of display lines #5 and #6, respectively, and the gate scan signals G(5) and G(6) are used to control programming of pixel circuits 140 of display lines #5 and #6. The dummy gate scan signals G_dummy(8) and the gate scan signal G(9) are used to control initialization of pixel circuits 140 of display lines #9 and #10, respectively, and the gate scan signals G(9) and G(10) are used to control programming of pixel circuits 140 of display lines #9 and #10. The dummy gate scan signals G_dummy(3) and G_dummy(7) generated by the dummy scan driving circuits $123_3$ and $123_7$ are used to accumulate electric charges in the dummy scan driving circuits $123_4$, and $123_8$, respectively. As discussed above in relation to FIG. 14, use of a pair of serially-connected dummy scan driving circuits 123 mitigates effects of charge leakage from pixel circuits 140 and charge leakage from bootstrap circuitry.

The right-side gate scan driver 120R includes a dummy scan driving circuit 122R, a plurality of pairs of dummy scan driving circuits 123, and a plurality of pairs of scan driving circuits 121. The dummy scan driving circuit 122R is configured to generate a dummy gate scan signal G_dummy(0), and the pairs of dummy scan driving circuits 123 and the pairs of scan driving circuits 121 are alternately connected in series to the output of the dummy scan driving circuit 122R. In the illustrated embodiment, the right-side gate scan driver 120R includes scan driving circuits $121_3$, $121_4$, $121_7$, and $121_8$ configured to supply gate scan signals G(3), G(4), G(7), and G(8) to display lines #3, #4, #7, and #8, respectively, and dummy scan driving circuits $123_1$, $123_2$, $123_5$, $123_6$, $123_9$, and $123_{10}$ configured to generate dummy gate scan signals G_dummy(1), G_dummy(2), G_dummy(5), G_dummy(6), G_dummy(9), and G_dummy(10), respectively. The dummy gate scan signals G_dummy(2) and the gate scan signal G(3) are used to control initialization of pixel circuits 140 of display lines #3 and #4, respectively, and the gate scan signals G(3) and G(4) are used to control programming of pixel circuits 140 of display lines #3 and #4. The dummy gate scan signals G_dummy(6) and the gate scan signal G(7) are used to control initialization of pixel circuits 140 of display lines #7 and #8, respectively, and the gate scan signals G(7) and G(8) are used to control programming of pixel circuits 140 of display lines #7 and #8. The dummy gate scan signals G_dummy(0), G_dummy(1) and G_dummy(5) generated by the dummy scan driving circuits 122R, $123_1$ and $123_5$ are used to accumulate electric charges in the dummy scan driving circuits $123_1$, $123_2$, and $123_6$.

The configuration illustrated in FIG. 16 enables flexibly adjusting the location of a horizontal sync period that include an LHB period in steps of two horizontal sync periods by controlling the waveforms of the left-side gate scan shift clocks GCK1_L and GCK2_L and the right-side gate scan shift clocks GCK1_R and GCK2_R. To dispose an LHB period in horizontal sync period #4$i$ for $i$ being a natural number, the left-side gate scan shift clocks GCK1_L and GCK2_L are kept deasserted during the previous horizontal sync period #4$i$−1 and asserted in the LHB period of horizontal sync period #4$i$. To dispose an LHB period in horizontal sync period #4$i$−2, the right-side gate scan shift clocks GCK1_R and GCK2_R are kept deasserted during the previous horizontal sync period #4$i$−3 and asserted in the LHB period of horizontal sync period #4$i$−2.

Figure 17:
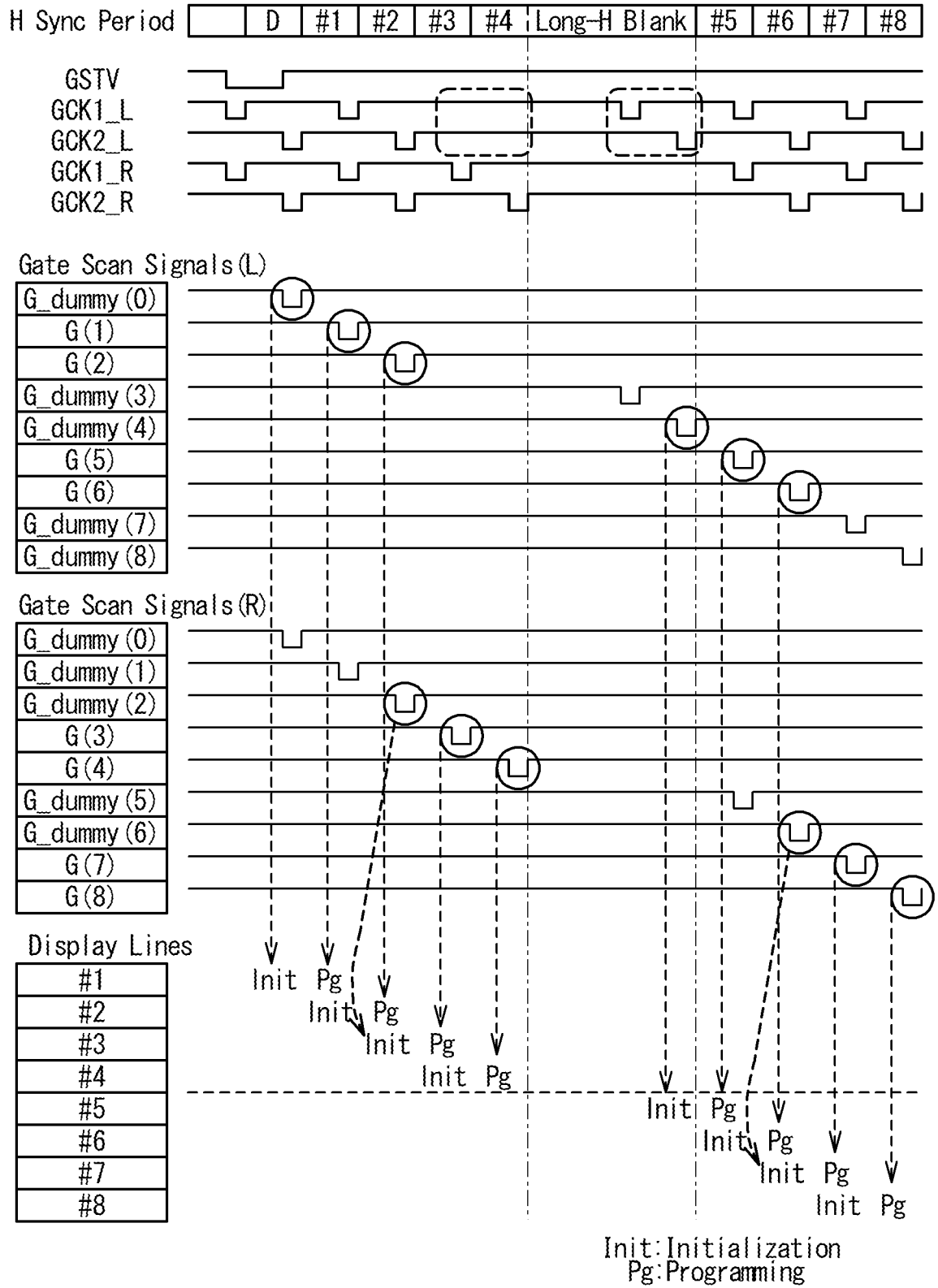
FIG. 17 illustrates an example operation of a display panel, according to one or more embodiments.

FIG. 17 illustrates an example operation of the display panel 100 illustrated in FIG. 16, according to one or more embodiments. In the illustrated embodiment, horizontal sync period #4 includes an LHB period.

The dummy gate scan signal G_dummy(0) supplied to display line #1 is asserted by the dummy scan driving circuit 122 of the left-side gate scan driver 120L in horizontal sync period D in response to the assertion of the gate scan start pulse signal GSTV in synchronization with the gate scan shift clocks GCK1_L and GCK2_L. In response to the assertion of the dummy gate scan signal G_dummy(0), the pixel circuits 140 of display line #1 are initialized in horizontal sync period D.

The gate scan signal G(1) is then asserted by the scan driving circuits $121_1$ of the left-side gate scan driver 120L in horizontal sync period #1. The pixel circuits 140 of display line #1 are programmed in response to the assertion of the gate scan signal G(1). The assertion of the gate scan signal G(1) also cause initialization of the pixel circuits 140 of display lines #2.

In the meantime, the dummy gate scan signals G_dummy (0) and G_dummy(1) are asserted by the dummy scan driving circuits 122 and $123_1$ in the right-side gate scan driver 120R. This allows the dummy scan driving circuit $123_2$ to get ready to boost the dummy gate scan signal G_dummy(2).

The gate scan signal G(2) is then asserted by the scan driving circuits $121_2$ of the left-side gate scan driver 120L in horizontal sync period #2. The pixel circuits 140 of display line #2 are programmed in response to the assertion of the gate scan signal G(2). It should be noted that the assertion of the gate scan signal G(2) does not cause initialization of the pixel circuits 140 of display line #3, since the gate scan signal G(2) is not supplied display line #3.

Concurrently, the dummy gate scan signal G_dummy(2) is asserted by the dummy scan driving circuits $123_2$ of the right-side gate scan driver 120R. The assertion of the dummy gate scan signal G_dummy(2) causes initialization of the pixel circuits 140 of display lines #3.

The gate scan signals G(3) and G(4) are then sequentially asserted by the scan driving circuits $121_3$ and $121_4$ of the right-side gate scan driver 120R in horizontal sync periods #3 and #4. The assertion of the gate scan signal G(3) causes initialization of the pixel circuits 140 of display line #4 and programming of the pixel circuits 140 of display line #3. The assertion of the gate scan signal G(4) causes programming of the pixel circuits 140 of display line #4.

The gate scan shift clocks GCK1_L and GCK2_L are kept deasserted during horizontal sync period #3 and therefore the dummy gate scan signal G_dummy(3) and G_dummy(4) are kept deasserted during horizontal sync period #3.

The gate scan shift clocks GCK1_L and GCK2_L are then sequentially asserted in the LHB period of horizontal sync period #4. The gate scan shift clocks GCK1_L and GCK2_L may be asserted at or near the end of the LHB period. In response to the assertions of the gate scan shift clocks GCK1_L and GCK2_L, the dummy gate scan signal G_dummy(3) and G_dummy(4) are sequentially asserted. The assertion of the dummy gate scan signal G_dummy(4) causes initialization of the pixel circuits 140 of display line #5.

The gate scan signal G(5) is then asserted by the scan driving circuit $121_5$ of the left-side gate scan driver 120L in horizontal sync period #5. The assertion of the dummy gate scan signal G_dummy(4) in the LHB period shortens the time duration between initialization and programming of the pixel circuits 140 of display line #5, mitigating the effects of charge leakage from the pixel circuits 140 of display line #5 and the charge leakage from the scan driving circuit $121_5$. This effectively suppress or avoid brightness unevenness or artifact at display line #5.

Figure 18:
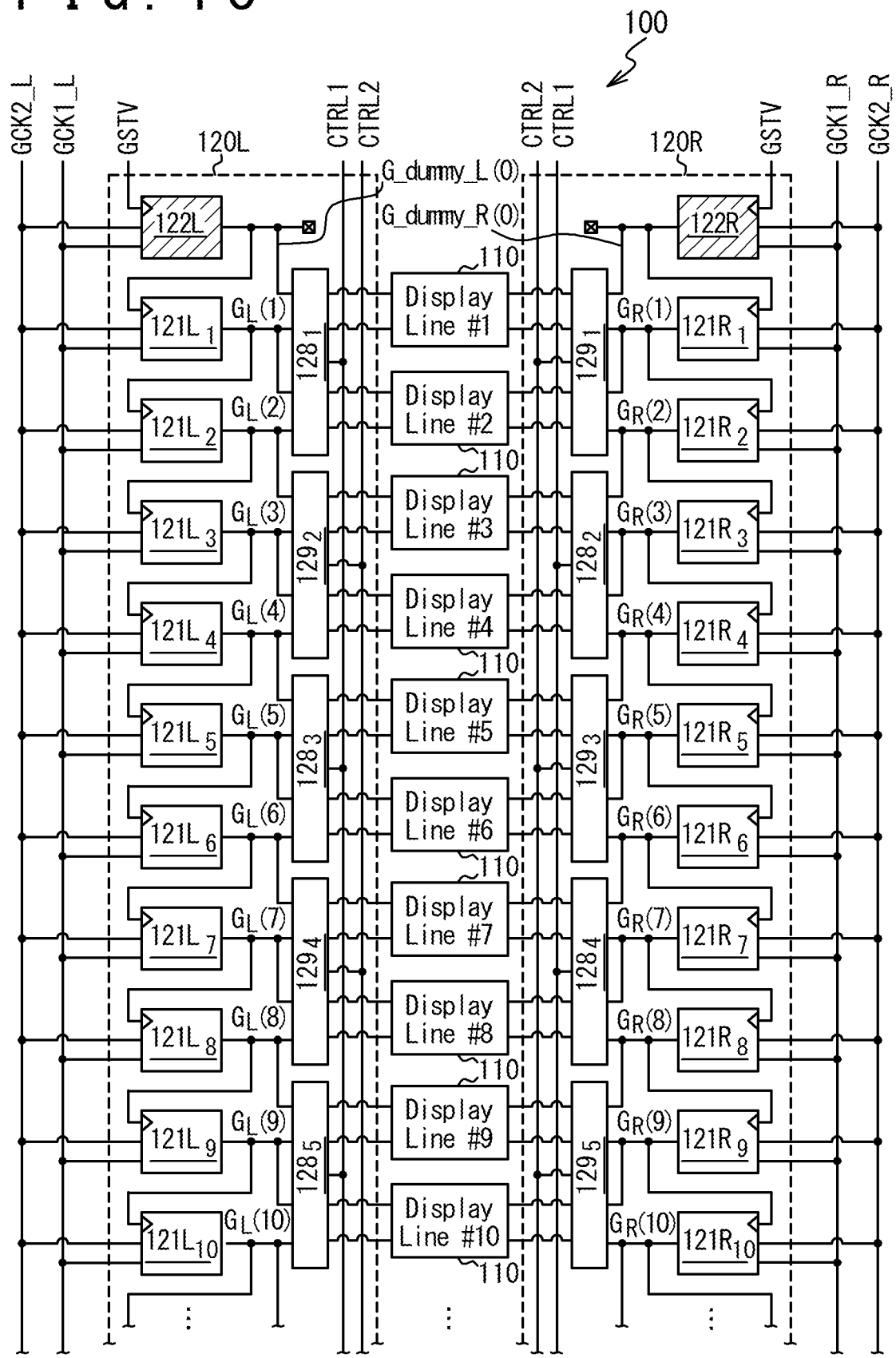
FIG. 18 illustrates an example configuration of a display panel, according to one or more embodiments.

FIG. 18 illustrates an example configuration of the display panel 100, according to still other embodiments. In the illustrated embodiment, the left-side gate scan driver 120L includes a dummy scan driving circuit 122L and a set of serially-connected scan driving circuits 121L connected to the dummy scan driving circuit 122L. The dummy scan driving circuit 122L is configured to generate a dummy gate scan signal G_dummy_L(0), and the scan driving circuits $121L_1$ to $121L_{10}$ are configured to generate gate scan signals $G_L(1)$ to $G_L(10)$, respectively.

The left-side gate scan driver 120L further includes switch circuits $128_1$, $128_3$, $128_5$ and $129_2$, and $129_4$. The switch circuits $128_1$, $128_3$, and $128_5$ are commonly controlled by a control signal CTRL1 received from the display driver 400 (illustrated in FIG. 4), and the switch circuits $129_2$ and $129_4$ are commonly controlled by a control signal CTRL2 received from the display driver 400. Each of the switch circuits $128_1$, $129_2$, $128_3$, $129_4$, and $128_5$ are associated with two display lines 110 and configured to control supply of the gate scan signals $G_L$ and the dummy gate scan signal G_dummy_L(0) if applicable to the associated display lines 110.

In one implementation, the switch circuit $128_1$ is configured to selectively connect and disconnect the dummy scan driving circuit 122L, the scan driving circuits $121L_1$ and $121L_2$ to and from the display lines #1 and #2 in response to the control signal CTRL1. The switch circuit $129_2$ is configured to selectively connect and disconnect the scan driving circuits $121L_2$, $121L_3$ and $121L_4$ to and from the display lines #3 and #4 in response to the control signal CTRL2. The switch circuit $128_3$ is configured to selectively connect and disconnect the scan driving circuits $121L_4$, $121L_5$ and $121L_6$ to and from the display lines #5 and #6 in response to the control signal CTRL1. The switch circuit $129_4$ is configured to selectively connect and disconnect the scan driving circuits $121L_6$, $121L_7$ and $121L_8$ to and from the display lines #7 and #8 in response to the control signal CTRL2. The switch circuit $128_5$ is configured to selectively connect and disconnect the scan driving circuits $121L_8$, $121L_9$ and $121L_{10}$ to and from the display lines #9 and #10 in response to the control signal CTRL1.

The right-side gate scan driver 120R includes a dummy scan driving circuit 122R and a set of serially-connected scan driving circuits 121R connected to the dummy scan driving circuit 122R. The dummy scan driving circuit 122R is configured to generate a dummy gate scan signal G_dummy_R(0), and the scan driving circuits $121R_1$ to $121R_{10}$ are configured to generate gate scan signals GR(1) to GR(10), respectively.

The right-side gate scan driver 120R further includes switch circuits $129_1$, $129_3$, $129_5$ and $128_2$, and $128_4$. The switch circuits $129_1$, $129_3$, and $129_5$ are commonly controlled by the control signal CTRL2, and the switch circuits $128_2$ and $128_4$ are commonly controlled by the control signal CTRL1. Each of the switch circuits $129_1$, $128_2$, $129_3$, $128_4$, and $129_5$ are associated with two display lines 110 and configured to control supply of the gate scan signals $G_R$ and the dummy gate scan signal G_dummy_R(0) if applicable to the associated display lines 110.

In one implementation, the switch circuit $129_1$ is configured to selectively connect and disconnect the dummy scan driving circuit 122R, the scan driving circuits $121R_1$ and $121R_2$ to and from the display lines #1 and #2 in response to the control signal CTRL2. The switch circuit $128_2$ is configured to selectively connect and disconnect the scan driving circuits $121R_2$, $121R_3$ and $121R_4$ to and from the display lines #3 and #4 in response to the control signal CTRL1. The switch circuit $129_3$ is configured to selectively connect and disconnect the scan driving circuits $121R_4$, $121R_5$ and $121R_6$ to and from the display lines #5 and #6 in response to the control signal CTRL2. The switch circuit $128_4$ is configured to selectively connect and disconnect the scan driving circuits $121R_6$, $121R_7$ and $121R_8$ to and from the display lines #7 and #8 in response to the control signal CTRL1. The switch circuit $129_5$ is configured to selectively connect and disconnect the scan driving circuits $121R_8$, $121R_9$ and $121R_{10}$ to and from the display lines #9 and #10 in response to the control signal CTRL2.

In one or more embodiments, the display panel 100 configured as illustrated in FIG. 18 have multiple operation modes. The operation modes of the display panel 100 may include a dual side driving mode (also referred to as first mode) in which both the control signals CTRL1 and CTRL2 are asserted. In the dual side driving mode, the left-side gate scan driver 120L and the right-side gate scan driver 120R concurrently supply the dummy gate scan signals G_dummy_L(0) and G_dummy_R(0), the gate scan signals $G_L(1)$ to $G_L(10)$, and $G_R(1)$ to $G_R(10)$ to display lines #1 to #10. The dummy gate scan signals G_dummy_L(0) and G_dummy_R(0) are used to control initialization of the pixel circuits 140 of display line #1, and the gate scan signals $G_L(1)$ to $G_L(9)$ and $G_R(1)$ to $G_R(9)$ are used to control initialization of the pixel circuits 140 of display line #2 to #10. The gate scan signals $G_L(1)$ to $G_L(10)$ and $G_R(1)$ to $G_R(10)$ are further used to control programming of pixel circuits 140 of display lines #1 to #10. In the dual side driving mode, no horizontal sync periods have an LHB period.

The operation modes of the display panel 100 may include a left-first one side driving mode (also referred to as second mode.) In the left-first one side driving mode, the control signal CTRL1 is asserted to activate the switch circuits $128_1$ to $128_5$, and the control signal CTRL2 is deasserted to deactivate the switch circuits $129_1$ to $129_5$. In the left-first one side driving mode, the display panel 100 illustrated in FIG. 18 operates identically to that illustrated in FIG. 16. For example, the activated switch circuit $128_1$ allows the dummy scan driving circuit 122L and the scan driving circuit $121L_1$ to supply the dummy gate scan signal G_dummy_L(0) and the gate scan signal $G_L(1)$ to the display lines #1 and #2 respectively, to control initialization of pixel circuits 140 thereof, and also allows the scan driving circuits $121L_1$ and $121L_2$ to supply the gate scan signals $G_L(1)$ and $G_L(2)$ to display lines #1 and #2 to control programming of pixel circuits 140 thereof. In the meantime, the deactivated switch circuit $129_1$ disconnects the dummy scan driving circuit 122R and the scan driving circuits $121R_1$ and $121R_2$ from display lines #1 and #2. The switch circuit $128_2$ to $128_5$ operate similarly to the switch circuit $128_1$, and the switch circuit $129_2$ to $129_5$ operate similarly to the switch circuit $129_1$.

The operation modes of the display panel 100 may include a right-first one side driving mode (also referred to as third mode) in which the control signal CTRL1 is deasserted to deactivate the switch circuits $128_1$ to $128_5$, and the control signal CTRL2 is asserted to activate the switch circuits $129_1$ to $129_5$. In the right-first one side driving mode, the display panel 100 illustrated in FIG. 18 operates similarly to that illustrated in FIG. 16, except for that the left-side gate scan driver 120L and the right-side gate scan driver 120R operate with the right and left sides reversed. For example, the activated switch circuit $129_1$ allows the dummy scan driving circuit 122R and the scan driving circuit $121R_1$ to supply the dummy gate scan signal G_dummy_R(0) and the gate scan signal $G_R(1)$ to the display lines #1 and #2 respectively, to control initialization of pixel circuits 140 thereof, and also allows the scan driving circuits $121R_1$ and $121R_2$ to supply the gate scan signals $G_R(1)$ and $G_R(2)$ to display lines #1 and #2 to control programming of pixel circuits 140 thereof. In the meantime, the deactivated switch circuit $128_1$ disconnects the dummy scan driving circuit 122L and the scan driving circuits $121L_1$ and $121L_2$ from display lines #1 and #2. The switch circuit $128_2$ to $128_5$ operate similarly to the switch circuit $128_1$, and the switch circuit $129_2$ to $129_5$ operate similarly to the switch circuit $129_1$.

The operations in the left-first one side driving mode and in the right-first one side driving mode may be alternated in a predetermined periodicity. This may reduce a display artifact potentially generated in the left-first one side driving mode and/or right-first one side driving mode. The periodicity may be determined in units of a predetermined number of frame periods. In one implementation, the periodicity may be two frame periods. In such embodiments, the display panel 100 may be placed in the left-first one side driving mode during a first frame period and in the right-first one side driving mode during a second frame period that follows the first frame period.

In one or more embodiments, updating of each pixel circuit 140 may be achieved by repeating initialization and programming of the pixel circuit 140 a plurality of times. This may improve the image quality.

Figure 19A:
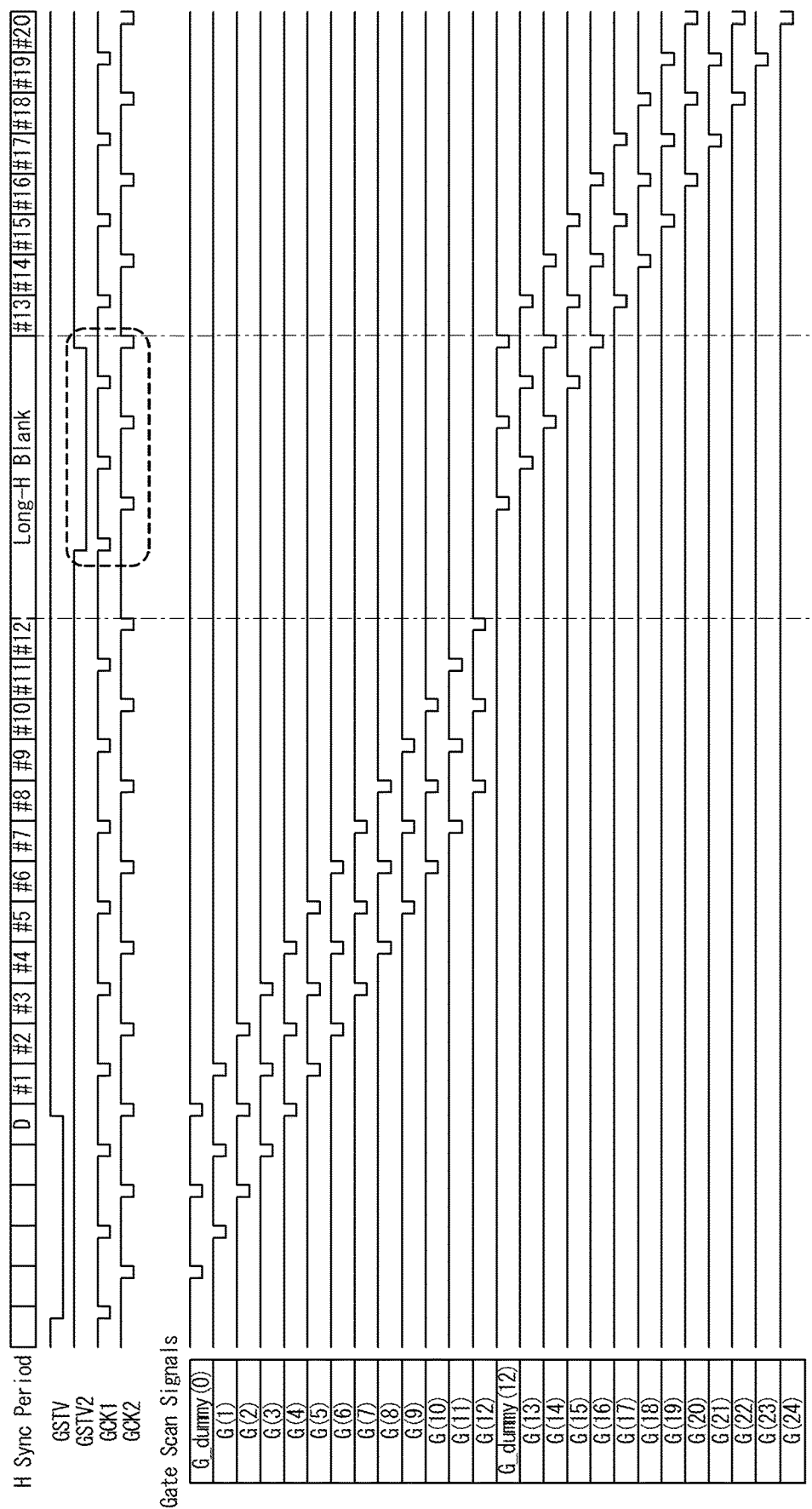

In embodiments where an additional gate scan start pulse signal GSTV2 is used (see FIG. 9, FIG. 11, and FIG. 12, for example), the repeated initialization and programming may be achieved by increasing the time duration during which the gate scan start pulse signals GSTV and GSTV2 are asserted. FIG. 19A and FIG. 19B illustrate an example operation of the display panel 100 in such embodiments. In the illustrated embodiment, initialization and programming are repeated three times in updating each display line 110. The gate scan start pulse signal GSTV2 is asserted in the LHB period of horizontal sync period #4. During the period during which the gate scan start pulse signal GSTV2 is asserted, the gate scan shift clocks GCK1 is asserted three times and the gate scan shift clocks GCK2 is asserted twice. This is followed by deasserting the gate scan start pulse signal GSTV2 and asserting the gate scan shift clocks GCK2. This process achieves three cycles of initialization and programming.

In embodiments where no additional gate scan start pulse signal GSTV2 is used (see FIG. 6, FIG. 14, and FIG. 16, for example), serially-connected dummy scan driving circuits may be disposed in each of the left-side gate scan driver 120L and the right-side gate scan driver 120R, the number of the serially-connected dummy scan driving circuits depending on the number of cycles of initialization and programming in updating each pixel circuit 140.

Figure 20:
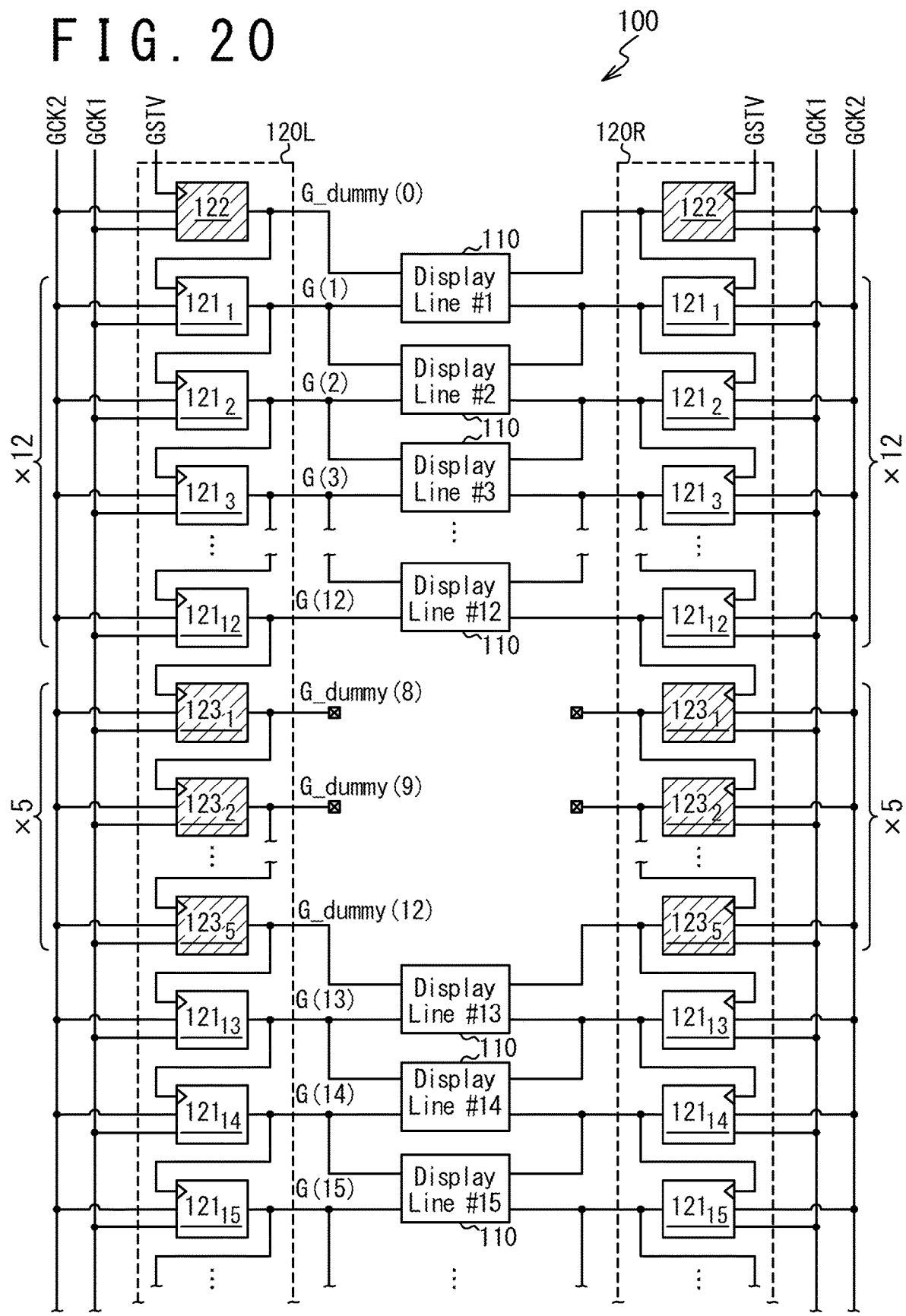
FIG. 20 illustrates an example configuration of a display panel, according to one or more embodiments.

FIG. 20 illustrates an example configuration of the display panel 100 adapted to repeated initialization and programming in updating each pixel circuit 140, according to one or more embodiments. In the illustrated embodiment, five serially-connected dummy scan driving circuits $123_1$ to $123_5$ are disposed between scan driving circuits $121_{12}$ and $121_{13}$ in each of the left-side gate scan driver 120L and the right-side gate scan driver 120R. The dummy scan driving circuits $123_1$ to $123_5$ are configured to generate dummy gate scan signals G_dummy(8) to G_dummy(12), respectively.

The number of the serially-connected dummy scan driving circuits 123 may be determined depending on the number of cycles of the initialization and programming. In one implementation, when the number of cycles of initialization and programming is N, the number of the serially-connected dummy scan driving circuits 123 may be 2N−1, where N is a natural number. Illustrated in FIG. 20 is the configuration adapted to three cycles of initialization and programming in updating each pixel circuit 140. The location of the serially-connected 2N−1 dummy scan driving circuits 123 may be determined depending on the location of a horizontal sync period that includes an LHB period. When horizontal sync period #k includes an LHB period, the serially-connected 2N−1 dummy scan driving circuits 123 may be inserted between the scan driving circuits $121_k$ and $121_{k+1}$, where k is a natural number of two or more.

Figure 21A:
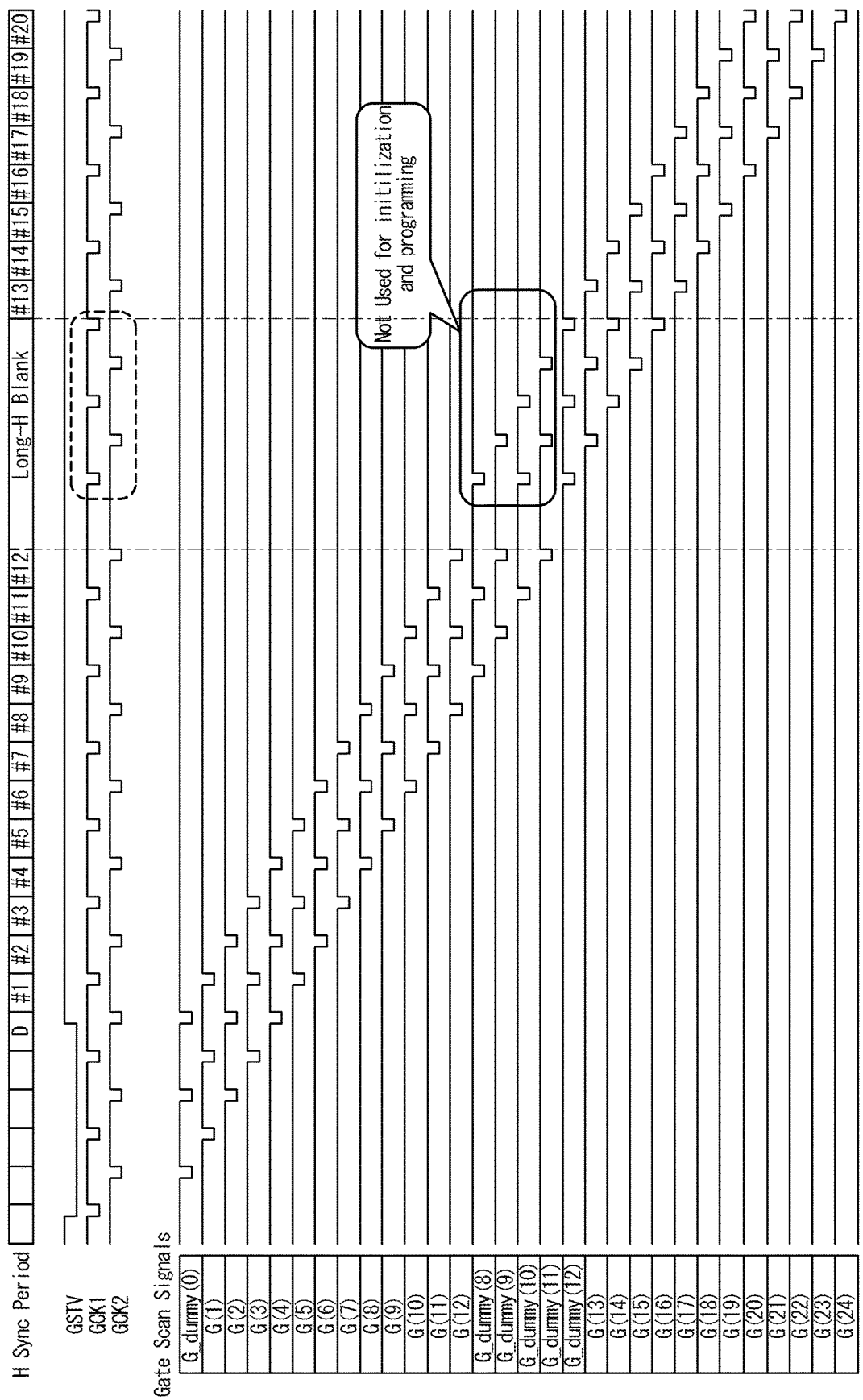
FIG. 21A and FIG. 21B illustrate an example operation of a display panel, according to one or more embodiments.
Figure 21B:
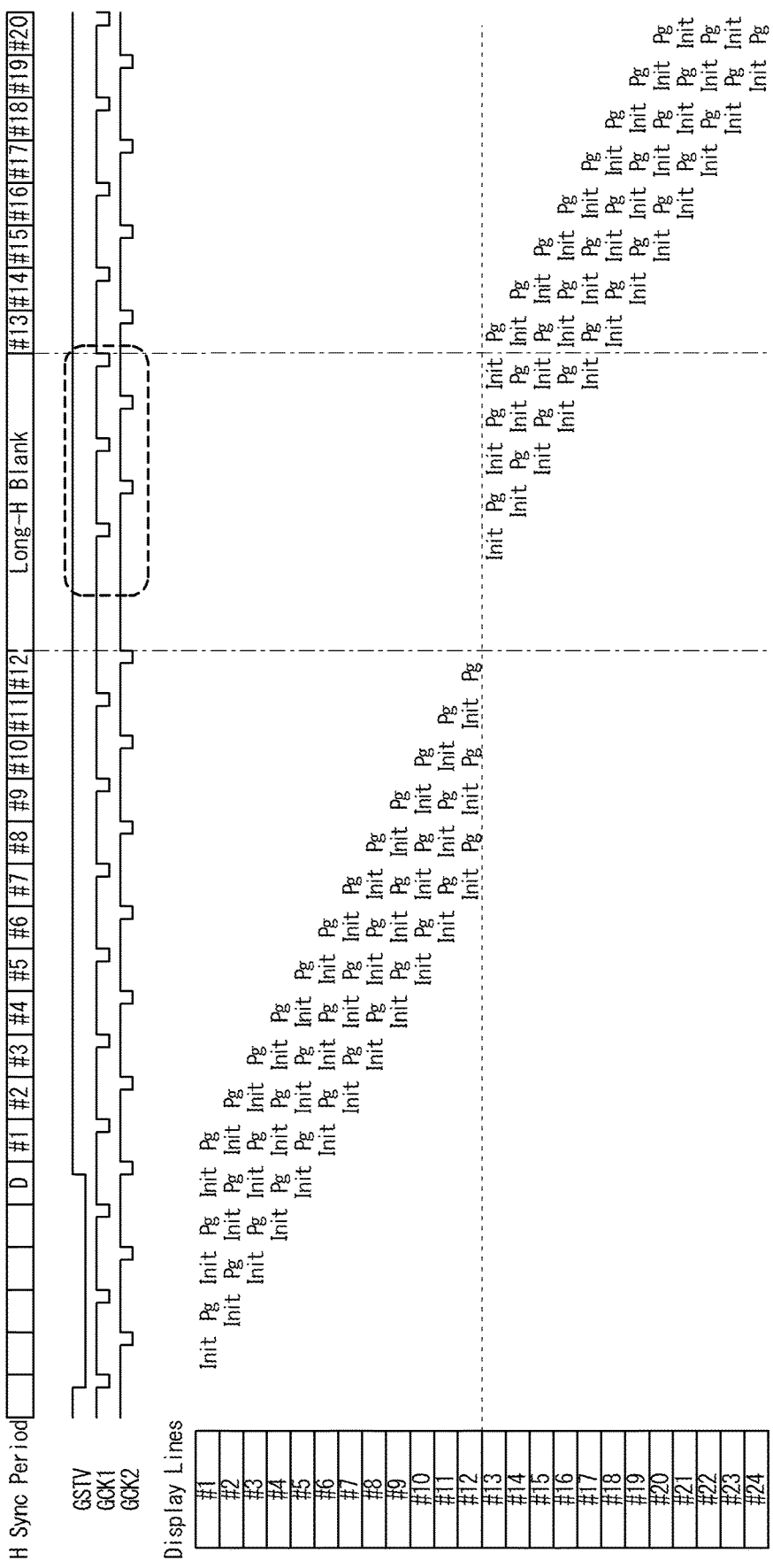

FIG. 21A and FIG. 21B illustrate an example operation of the display panel 100 illustrated in FIG. 20, according to one or more embodiments. In the illustrated embodiment, horizontal sync period #12 includes an LHB period. In the LHB period, as illustrated in FIG. 21A, the gate scan shift clock GCK1 is asserted three times and the gate scan shift clock GCK2 is asserted twice. The dummy gate scan signals G_dummy(8) to G_dummy(12) are driven in response to the assertions of the gate scan shift clocks GCK1 and GCK2. The dummy gate scan signals G_dummy(8) to G_dummy (11) are used to generate the dummy gate scan signal G_dummy(12). The dummy gate scan signal G_dummy(12) is used for initialization of pixel circuits 140 of display line #13 and the gate scan signal G(13) is used for programming of the pixel circuits 140 of display line #13. The dummy gate scan signal G_dummy(12) and the gate scan signal G(13) are each asserted three times to achieve three cycles of the initialization and programming.

Figure 22:
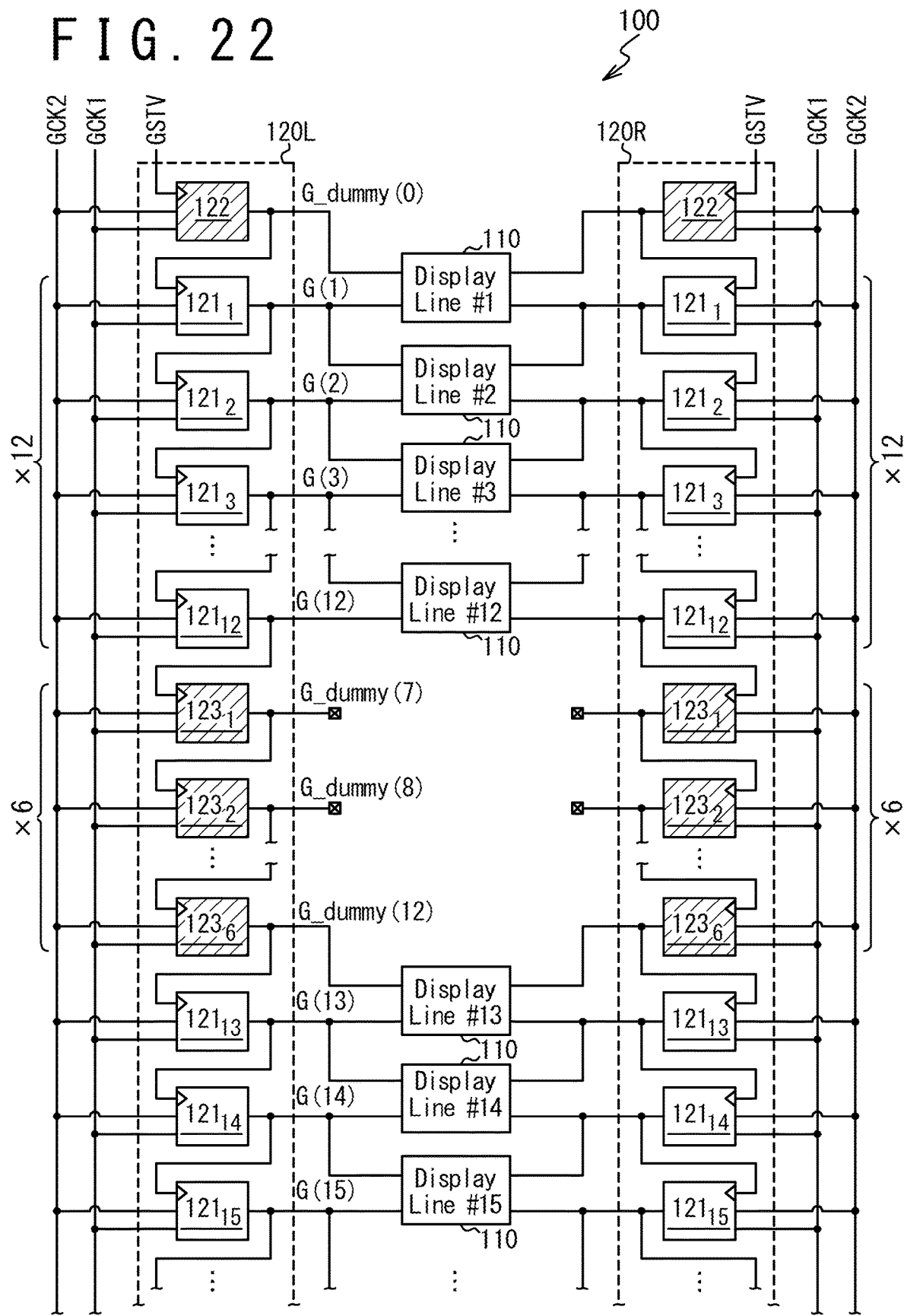
FIG. 22 illustrates an example configuration of a display panel, according to one or more embodiments.

FIG. 22 illustrates an example configuration of the display panel 100 adapted to repeated initialization and programming in updating each pixel circuit 140, according to other embodiments. In the illustrated embodiment, the number of the serially-connected dummy scan driving circuits 123 is 2N when the number of cycles of initialization and programming is N, differently from the configuration illustrated in FIG. 20. Illustrated in FIG. 22 is the configuration adapted to three cycles of initialization and programming in updating each pixel circuit 140, where six serially-connected dummy scan driving circuits $123_1$ to $123_6$ are disposed between scan driving circuits $121_{12}$ and $121_{13}$ in each of the left-side gate scan driver 120L and the right-side gate scan driver 120R. The dummy scan driving circuits $123_1$ to $123_6$ are configured to generate dummy gate scan signals G_dummy(7) to G_dummy(12), respectively. The location of the serially-connected 2N dummy scan driving circuits 123 may be determined depending on the location of a horizontal sync period that includes an LHB period. When horizontal sync period #k includes an LHB period, the serially-connected 2N dummy scan driving circuits 123 may be inserted between the scan driving circuits $121_k$ and $121_{k+1}$, where k is a natural number of two or more.

Figure 23B:
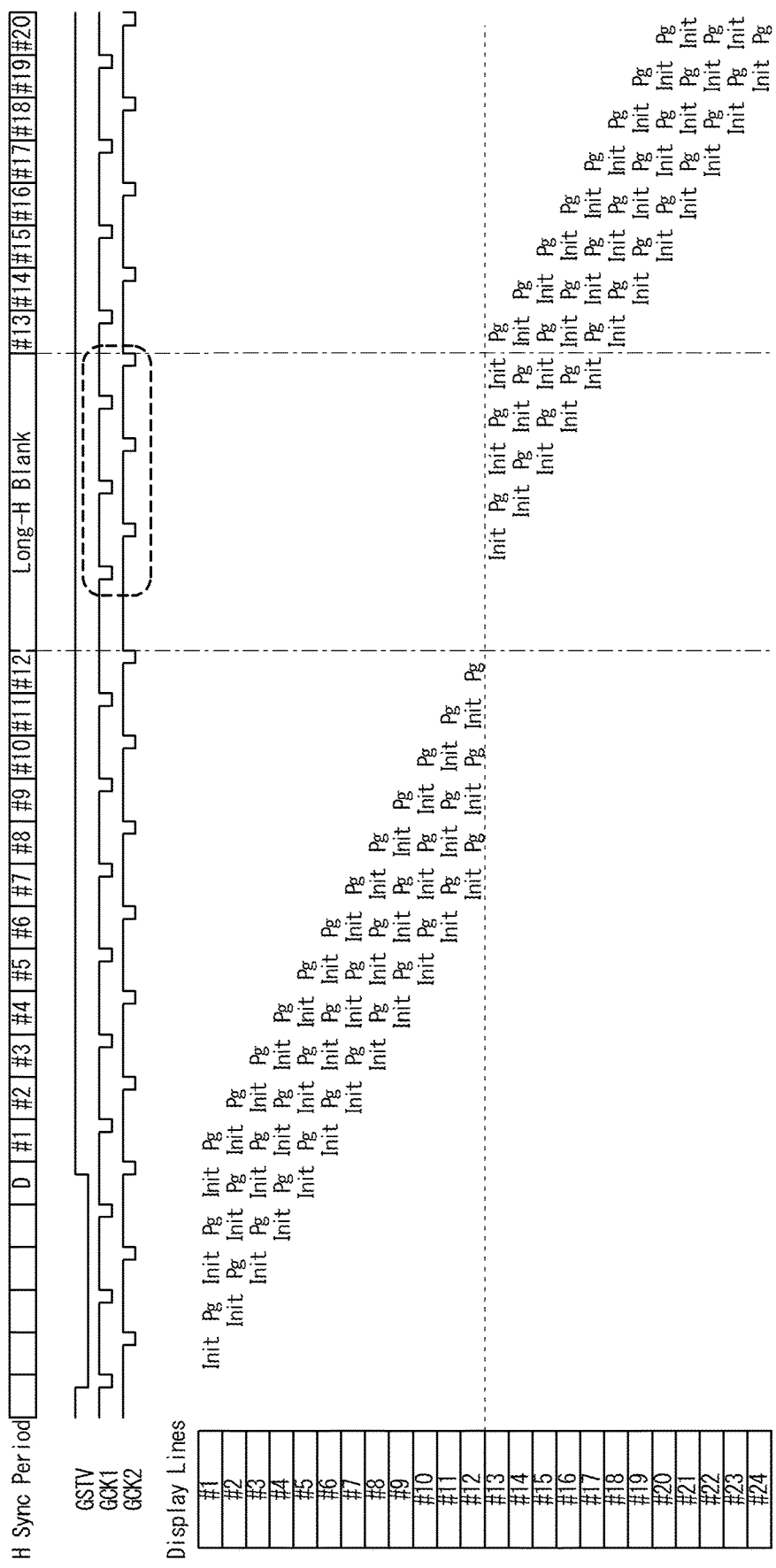

FIG. 23A and FIG. 23B illustrate an example operation of the display panel 100 illustrated in FIG. 22, according to one or more embodiments. In the illustrated embodiment, horizontal sync period #12 includes an LHB period.

Referring to FIG. 23A, the gate scan shift clocks GCK1 and GCK2 are asserted three times in the LHB period to drive the dummy gate scan signals G_dummy(7) to G_dummy(12). The dummy gate scan signals G_dummy(7) to G_dummy(11) are used to generate the dummy gate scan signal G_dummy(12). The dummy gate scan signal G_dummy(12) is used for initialization of pixel circuits 140 of display line #13 and the gate scan signal G(13) is used for programming of the pixel circuits 140 of display line #13. The dummy gate scan signal G_dummy(12) and the gate scan signal G(13) are each asserted three times to achieve three cycles of the initialization and programming, as illustrated in FIG. 23B.

Figure 24:
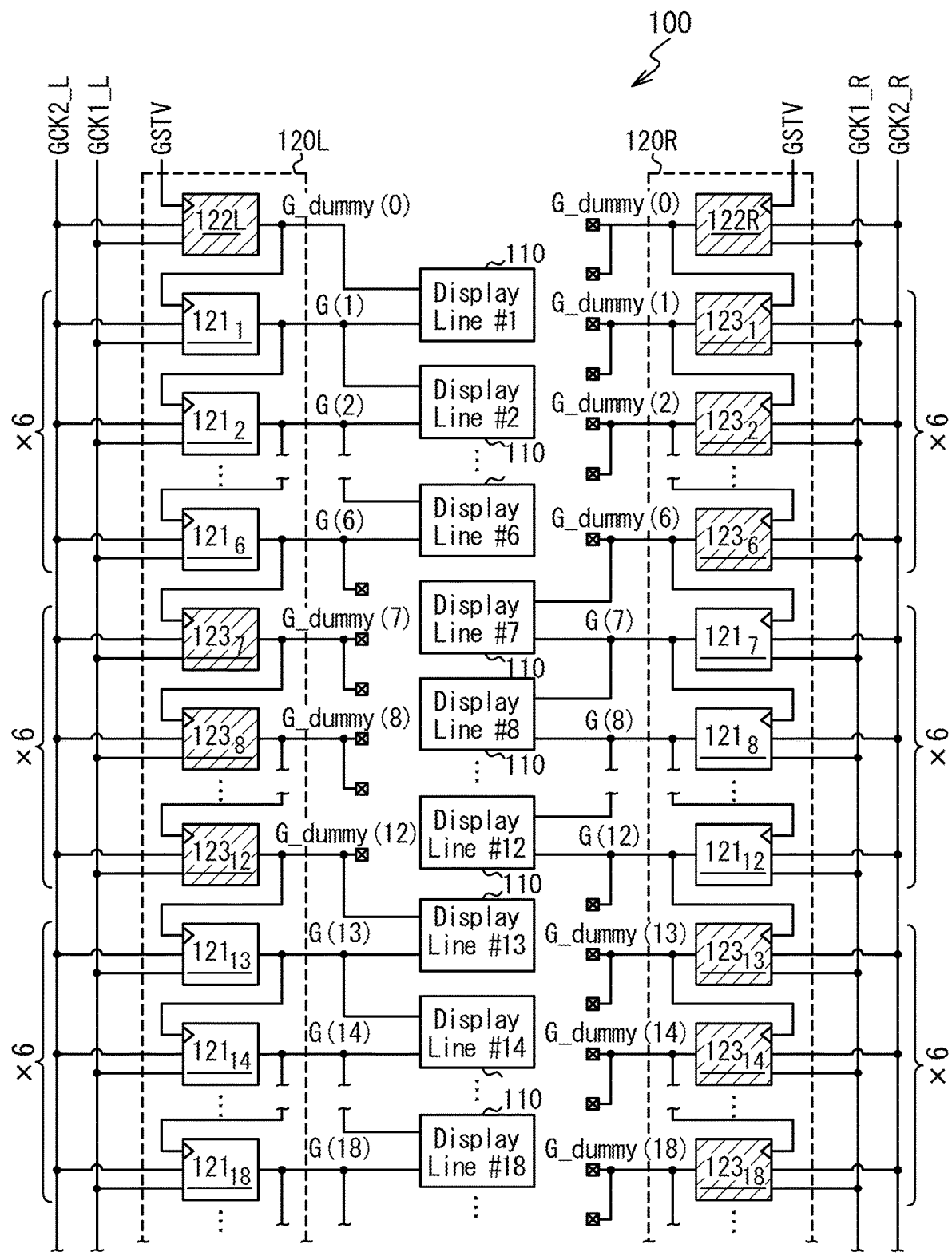
FIG. 24 illustrates an example configuration of a display panel, according to one or more embodiments.

FIG. 24 illustrates an example configuration of the display panel 100 adapted to repeated initialization and programming in updating each pixel circuit 140, according to still other embodiments.

In the illustrated embodiment, the left-side gate scan driver 120L and the right-side gate scan driver 120R are configured to operate with different operation timings, similarly to the embodiment described in relation to FIG. 16. The left-side gate scan driver 120L is configured to receive left-side gate scan shift clocks GCK1_L and GCK2_L from the left-side panel interface 420L (illustrated in FIG. 4), and the right-side gate scan driver 120R is configured to receive right-side gate scan shift clocks GCK1_R and GCK2_R from the right-side panel interface 420R.

The left-side gate scan driver 120L includes a dummy scan driving circuit 122L, a plurality of sets of serially-connected scan driving circuits 121 and a plurality of sets of serially-connected of dummy scan driving circuits 123. The sets of serially-connected scan driving circuits 121 and the sets of the serially-connected of dummy scan driving circuits 123 are alternately connected to the output of the dummy scan driving circuit 122L. The numbers of the serially-connected scan driving circuits 121 and serially-connected dummy scan driving circuits 123 in each set depend on the number of cycles of initialization and programming. The numbers of the serially-connected scan driving circuits 121 and the serially-connected dummy scan driving circuits 123 in each set are both 2N when the number of cycles of initialization and programming is N. In the illustrated embodiment, updating of each pixel circuit 140 includes three cycles of the initialization and programming, and accordingly the numbers of the serially-connected scan driving circuits 121 and the serially-connected dummy scan driving circuits 123 in each set is six.

In the illustrated embodiment, the dummy scan driving circuit 122L is configured to generate a dummy gate scan signal G_dummy(0), and the scan driving circuits $121_1$ to $121_6$ are configured to generate gate scan signals G(1) to G(6), respectively. Further, the dummy scan driving circuits $123_7$ to $123_{12}$ are configured to generate dummy gate scan signals G_dummy(7) to G_dummy(12), respectively, and the scan driving circuits $121_{13}$ to $121_{18}$ are configured to generate gate scan signals G(13) to G(18), respectively.

The right-side gate scan driver 120R includes a dummy scan driving circuit 122R, a plurality of sets of serially-connected of dummy scan driving circuits 123, and a plurality of sets of serially-connected scan driving circuits 121. The sets of the serially-connected of dummy scan driving circuits 123 and the sets of serially-connected scan driving circuits 121 are alternately connected to the output of the dummy scan driving circuit 122R.

In the illustrated embodiment, the dummy scan driving circuit 122R is configured to generate a dummy gate scan signal G_dummy(0), and the dummy scan driving circuits $123_1$ to $123_6$ are configured to generate gate scan signals G_dummy(1) to G_dummy(6), respectively. Further, the scan driving circuits $121_7$ to $121_{12}$ are configured to generate gate scan signals G(7) to G(12), respectively, and the dummy scan driving circuits $123_{13}$ to $123_{18}$ are configured to generate dummy gate scan signals G_dummy(13) to G_dummy (18), respectively.

Figure 25A:
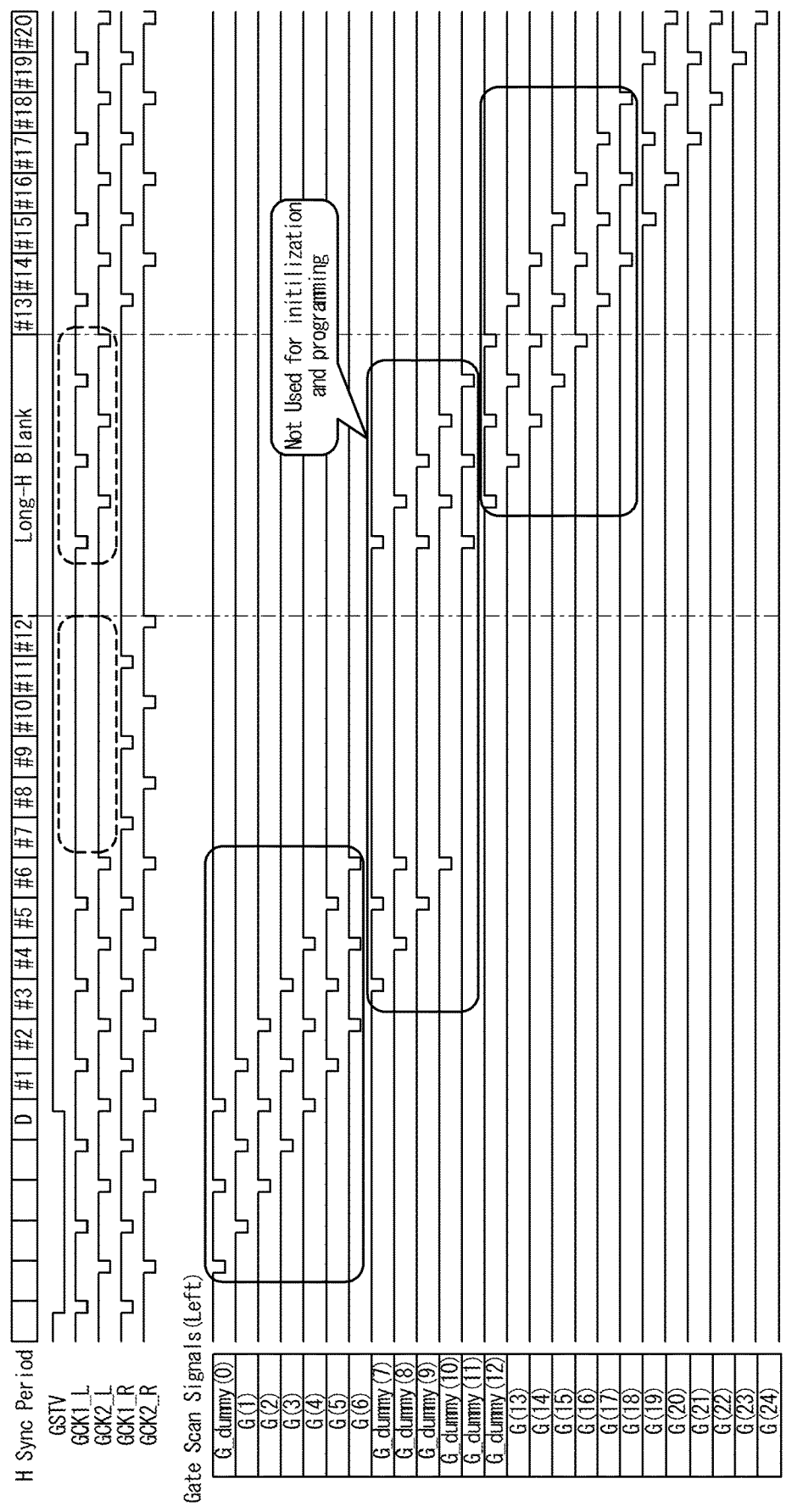
FIG. 25A, FIG. 25B, and FIG. 25C illustrate an example operation of a display panel, according to one or more embodiments.
Figure 25B:
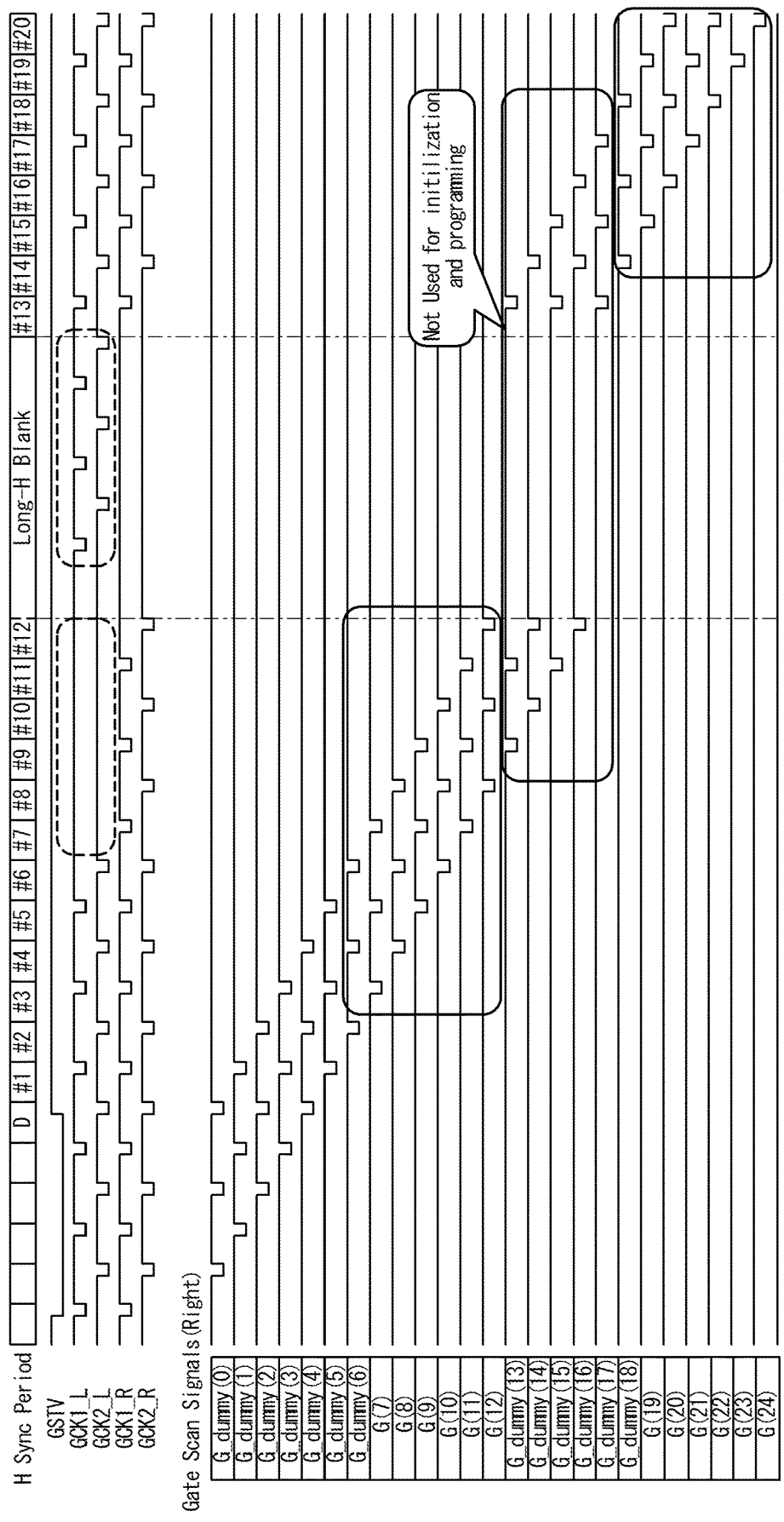
Figure 25C:
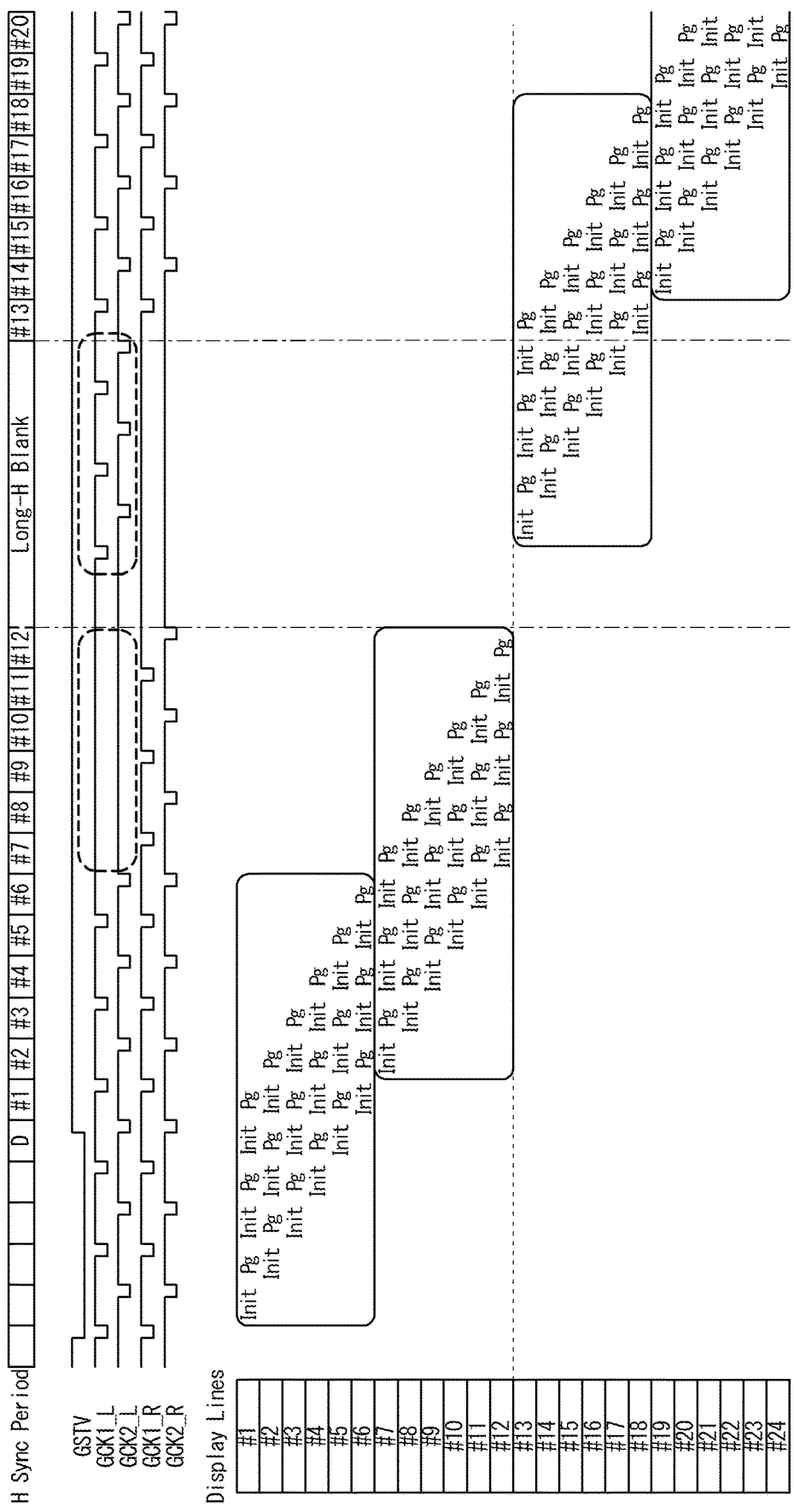

FIG. 25A, FIG. 25B, and FIG. 25C illustrate an example operation of the display panel 100 illustrated in FIG. 24, according to one or more embodiments. In the illustrated embodiment, horizontal sync period #12 includes an LHB period. Referring to FIG. 25A, the gate clock signals GCK1_L and GCK2_L are asserted three times in the LHB period to drive the dummy gate scan signals G_dummy(7) to G_dummy(12). The dummy gate scan signals G_dummy(7) to G_dummy(11) are used to generate the dummy gate scan signal G_dummy(12). The dummy gate scan signal G_dummy(12) is used for initialization of pixel circuits 140 of display line #13 and the gate scan signal G(13) is used for programming of the pixel circuits 140 of display line #13. The dummy gate scan signal G_dummy(12) and the gate scan signal G(13) are each asserted three times to achieve three cycles of the initialization and programming, as illustrated in FIG. 25C.

Further, as is the case with the configuration illustrated in FIG. 16, the configuration illustrated in FIG. 24 enables flexibly adjusting the location of a horizontal sync period that includes an LHB period in steps of six horizontal sync periods by controlling the waveforms of the left-side gate scan shift clocks GCK1_L and GCK2_L and the right-side gate scan shift clocks GCK1_R and GCK2_R.

Figure 26:
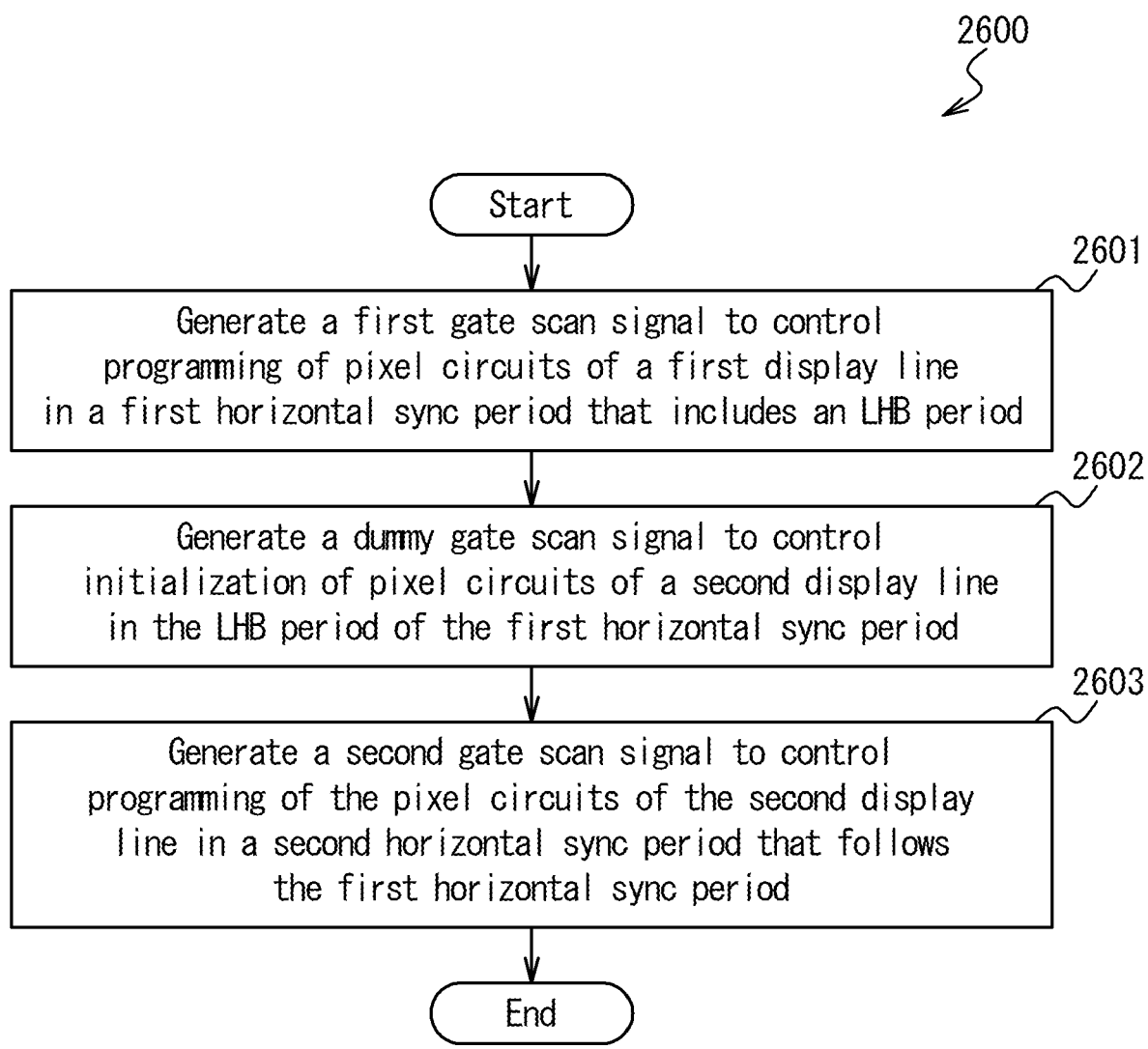
FIG. 26 illustrates an example method for controlling a display panel, according to one or more embodiments.

Method 2600 of FIG. 26 illustrates steps for controlling the display panel 100, according to one or more embodiments. It should be noted that the order of the steps may be altered from the order illustrated.

In step 2601, a first scan driving circuit generates a first gate scan signal to control programming of pixel circuits of a first display line in a first horizontal sync period that includes an LHB period. The first scan driving circuit may include a scan driving circuit 121 disposed in a left-side gate scan driver 120L as illustrated in FIGS. 6, 9, 11, 12, 13, 14, 16, 18, 20, 22, and 24.

In step 2602, a second scan driving circuit generates a dummy gate scan signal to control initialization of pixel circuits of a second display line in the LHB period of the first horizontal sync period. The dummy gate scan signal is asserted in the LHB period to cause the initialization of the pixel circuits of the second display line, independently of the first gate scan signal. The second display line may be located adjacent to the first display line. The second scan driving circuit may include a dedicated dummy scan driving circuit 123 configured to generate the dummy gate scan signal, i.e., not configured to generate a gate scan signal used to control programming of any pixel circuits 140 as illustrated in FIGS. 6, 9, 11, 12, 13, 14, 16, 20, and 22. In one or more embodiments, both the first scan driving circuit (e.g., a scan driving circuit 121) and the second gate scan driving circuit (e.g., a dummy scan driving circuit 123) may be integrated in the left-side gate scan driver 120L or the right-side gate scan driver 120R. In some embodiments, as illustrated in FIG. 13, one of the first scan driving circuit (e.g., a scan driving circuit 121) and the second gate scan driving circuit (e.g., a dummy scan driving circuit 123) may be integrated in the left-side gate scan driver 120L and the other may be integrated in the right-side gate scan driver 120R.

In step 2603, a third scan driving circuit generates a second gate scan signal to control programming of the pixel circuits of the second display line in a second horizontal sync period that follows the first horizontal sync period. The third scan driving circuit may include a different scan driving circuit 121 disposed in the left-side gate scan driver 120L or the right-side gate scan driver 120R.

The use of the dummy gate scan signal to control initialization of the second display line in the LHB period enables shortening the time duration between the initialization and programming of the pixel circuits of the second display line, reducing charge leakage. This may mitigate brightness unevenness or artifact in a display image.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display panel, comprising:
   a first scan driving circuit configured to generate a first gate scan signal to control programming of a first display line in a first horizontal sync period that includes a long horizontal blank (LHB) period;
   a second scan driving circuit configured to generate a first dummy gate scan signal to control initialization of a second display line in the LHB period of the first horizontal sync period; and
   a third scan driving circuit configured to generate a second gate scan signal to control programming of the second display line in a second horizontal sync period that follows the first horizontal sync period,
   wherein the first scan driving circuit is located in a first direction with respect to the first display line,
   wherein the first scan driving circuit is configured to generate the first gate scan signal in synchronization with a first pair of gate scan shift clocks, wherein the second scan driving circuit is located in a second direction with respect to the first display line, the second direction being opposite to the first direction, and wherein the second scan driving circuit is configured to generate the first dummy gate scan signal in synchronization with a second pair of gate scan shift clocks generated independently of the first pair of gate scan shift clocks.

2. The display panel of claim 1, wherein generating the first dummy gate scan signal comprises asserting the first dummy gate scan signal in the LHB period.

3. The display panel of claim 1, wherein the second scan driving circuit is configured to receive a gate scan start pulse signal from a display driver external to the display panel and generate the first dummy gate scan signal using the gate scan start pulse signal.

4. The display panel of claim 1, further comprising:
a selector configured to select one of the first gate scan signal and the first dummy gate scan signal,
wherein the initialization of the second display line is controlled by the selected one of the first gate scan signal and the first dummy gate scan signal.

5. The display panel of claim 4, further comprising:
a decoder configured to decode a set of select signals to generate a resultant select signal,
wherein selecting the one of the first gate scan signal and the first dummy gate scan signal comprises selecting the one of the first gate scan signal and the first dummy gate scan signal based on the resultant select signal.

6. The display panel of claim 1, wherein the second scan driving circuit is configured to generate the first dummy gate scan signal by using the first gate scan signal.

7. The display panel of claim 1, further comprising:
a plurality of serially-connected dummy scan driving circuits configured to receive the first gate scan signal and generate a plurality of second dummy gate scan signals by using the first gate scan signal,
wherein the second scan driving circuit comprises a second dummy scan driving circuit configured to generate the first dummy gate scan signal by using one of the plurality of second dummy gate scan signals.

8. The display panel of claim 7, wherein the second dummy scan driving circuit is configured to assert the first dummy gate scan signal a plurality of times in the LHB period.

9. A display panel, comprising:
a first scan driving circuit configured to generate a first gate scan signal to control programming of a first display line in a first horizontal sync period that includes a long horizontal blank (LHB) period;
a second scan driving circuit configured to generate a first dummy gate scan signal to control initialization of a second display line in the LHB period of the first horizontal sync period; and
a third scan driving circuit configured to generate a second gate scan signal to control programming of the second display line in a second horizontal sync period that follows the first horizontal sync period,
a first pair of serially-connected scan driving circuits configured to control programming of a first pair of display lines, the first pair of serially-connected scan driving circuits including the first scan driving circuit, and the first pair of display lines including the first display line;
a second pair of serially-connected scan driving circuits configured to control programming of a second pair of display lines, the second pair of serially-connected scan driving circuits including the second scan driving circuit, and the first pair of display lines including the first display line;
a first switch circuit configured to selectively connect the first pair of serially-connected scan driving circuits to the first pair of display lines; and
a second switch circuit configured to selectively connect the second pair of serially-connected scan driving circuits to the second pair of display lines.

10. The display panel of claim 9, further comprising:
a third pair of serially-connected scan driving circuits configured to control programming the first pair of display lines, the first pair of display lines being located between the first pair of serially-connected scan driving circuits and the third pair of serially-connected scan driving circuits;
a fourth pair of serially-connected scan driving circuits configured to control programming the second pair of display lines, the second pair of display lines being located between the second pair of serially-connected scan driving circuits and the fourth pair of serially-connected scan driving circuits;
a third switch circuit configured to selectively connect the first pair of serially-connected scan driving circuits to the first pair of display lines; and
a fourth switch circuit configured to selectively connect the second pair of serially-connected scan driving circuits to the second pair of display lines.

11. A user interface device, comprising:
a display panel comprising:
a first scan driving circuit configured to generate a first gate scan signal to control programming of a first display line in a first horizontal sync period that includes a long horizontal blank (LHB) period,
a second scan driving circuit configured to generate a first dummy gate scan signal to control initialization of a second display line in the LHB period of the first horizontal sync period, and
a third scan driving circuit configured to generate a second gate scan signal to control programming of the second display line in a second horizontal sync period that follows the first horizontal sync period;
wherein the first scan driving circuit is located in a first direction with respect to the first display line,
wherein the first scan driving circuit is configured to generate the first gate scan signal in synchronization with a first pair of gate scan shift clocks,
wherein the second scan driving circuit is located in a second direction with respect to the first display line, the second direction being opposite to the first direction, and
wherein the second scan driving circuit is configured to generate the first dummy gate scan signal in synchronization with a second pair of gate scan shift clocks generated independently of the first pair of gate scan shift clocks; and
a sensor module configured to receive a resulting signal from a sensor electrode disposed in a sensing region of the display panel during the LHB period and sense one or more input objects in the sensing region based on the resulting signal.

12. The user interface device of claim 11,
wherein the third scan driving circuit is configured to operate in synchronization with a third pair of gate scan shift clocks.

13. A method, comprising:
generating, by a first scan driving circuit, a first gate scan signal to control programming of a first display line in a first horizontal sync period that includes a LHB period;
generating, by a second scan driving circuit, a dummy gate scan signal to control initialization of a second display line in the LHB period of the first horizontal sync period; and
generating a second gate scan signal to control programming of the second display line in a second horizontal sync period that follows the first horizontal sync period,
wherein the first scan driving circuit is located in a first direction with respect to the first display line,
wherein the first scan driving circuit is configured to generate the first gate scan signal in synchronization with a first pair of gate scan shift clocks,
wherein the second scan driving circuit is located in a second direction with respect to the first display line, the second direction being opposite to the first direction, and
wherein the second scan driving circuit is configured to generate the first dummy gate scan signal in synchronization with a second pair of gate scan shift clocks generated independently of the first pair of gate scan shift clocks.

14. The method of claim 13, wherein generating the dummy gate scan signal comprises asserting the dummy gate scan signal.

15. A display panel, comprising:
a first scan driving circuit configured to generate a first gate scan signal to control programming of a first display line in a first horizontal sync period that includes a long horizontal blank (LHB) period;
a second scan driving circuit configured to generate a first dummy gate scan signal to control initialization of a second display line in the LHB period of the first horizontal sync period;
a third scan driving circuit configured to generate a second gate scan signal to control programming of the second display line in a second horizontal sync period that follows the first horizontal sync period;
a fourth scan driving circuit configured to generate a third gate scan signal to control programming of a third display line;
a fifth scan driving circuit configured to generate a fourth gate scan signal to control programming of a fourth display line, the third display line and the fourth display line being located between the first display line and the second display line,
a first dummy scan driving circuit configured to receive the first gate scan signal and generate a second dummy gate scan signal by using the first gate scan signal,
wherein the second scan driving circuit comprises a second dummy scan driving circuit configured to generate the first dummy gate scan signal by using the second dummy gate scan signal
wherein the first scan driving circuit, the first dummy scan driving circuit, the second dummy scan driving circuit, and the third scan driving circuit are located in a first direction with respect to the first display line and the second display line, and
wherein the fourth scan driving circuit and the fifth scan driving circuit are located in a second direction opposite to the first direction with respect to the third display line and the fourth display line.

16. The display panel of claim 15,
wherein the first scan driving circuit, the first dummy scan driving circuit, the second dummy scan driving circuit, and the third scan driving circuit are configured to operate in synchronization with a first pair of gate scan shift clocks, and
wherein the fourth scan driving circuit and the fifth scan driving circuit are configured to operate in synchronization with a second pair of gate scan shift clocks generated independently of the first pair of gate scan shift clocks.

17. The display panel of claim 15, further comprising:
a third dummy scan driving circuit configured to generate a third dummy gate scan signal to control initialization of the third display line,
wherein the third gate scan signal controls initialization of the fourth display line.

* * * * *